US012703570B2

(12) United States Patent
Hogan et al.

(10) Patent No.: US 12,703,570 B2
(45) Date of Patent: Aug. 11, 2026

(54) TRANSFER APPARATUS AND FAST, FOOTPRINT OPTIMIZED ITEM TRANSFER STATION

(71) Applicant: Amazon Technologies, Inc., Seattle, WA (US)

(72) Inventors: Scott Hogan, Mukilteo, WA (US); Tait Stephen Carroll, Seattle, WA (US); Michael Andrew DeMalia, South Easton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 797 days.

(21) Appl. No.: 18/075,530

(22) Filed: Dec. 6, 2022

(65) Prior Publication Data

US 2024/0391693 A1 Nov. 28, 2024

(51) Int. Cl.

*B65G 1/04* (2006.01)
*B25J 9/10* (2006.01)
*B65G 47/91* (2006.01)

(52) U.S. Cl.

CPC ............ *B65G 1/0485* (2013.01); *B25J 9/102* (2013.01); *B25J 9/104* (2013.01); *B65G 47/914* (2013.01); *B65G 47/917* (2013.01)

(58) Field of Classification Search

CPC .. B65G 1/0485; B65G 47/914; B65G 47/917; B25J 9/102; B25J 9/104

See application file for complete search history.

(56) References Cited

U.S. PATENT DOCUMENTS

| | | | | |
|---|---|---|---|---|
| 6,377,867 | B1 | 4/2002 | Bradley et al. | |
| 10,138,060 | B1 | 11/2018 | Mantha et al. | |
| 10,865,043 | B1 | 12/2020 | Garcia et al. | |
| 11,787,635 | B2 * | 10/2023 | Blotnik | B65G 1/1375 700/218 |
| 2020/0013651 | A1 | 1/2020 | Nakayama et al. | |
| 2020/0039747 | A1 | 2/2020 | Ahmann et al. | |
| 2020/0290214 | A1 | 9/2020 | Watanabe et al. | |
| 2020/0383251 | A1 | 12/2020 | Ito | |
| 2024/0083696 | A1 * | 3/2024 | Held | B65G 47/905 |
| 2024/0166455 | A1 * | 5/2024 | Hocker | B65G 43/00 |

(Continued)

FOREIGN PATENT DOCUMENTS

WO 2021122218 A1 6/2021

OTHER PUBLICATIONS

GB2318299.1, "Combined Search and Examination Report", May 14, 2024, 6 pages.

(Continued)

*Primary Examiner* — Saul Rodriguez
*Assistant Examiner* — Ashley K Romano
(74) *Attorney, Agent, or Firm* — Kilpatrick Townsend & Stockton LLP

(57) ABSTRACT

A transfer apparatus can include a lateral frame extending in a first direction. An upright frame can be arranged to guide and support movement of the lateral frame in a second direction. A first rotatable head can be coupled to the lateral frame and configured to translate in the first direction. A second rotatable head can be coupled to the lateral frame and configured to translate in the first direction. The second rotatable head can be spaced from the first rotatable head. The second rotatable head can rotate and translate independently of the first rotatable head.

20 Claims, 16 Drawing Sheets

(56) References Cited

U.S. PATENT DOCUMENTS

| | | | | |
|---|---|---|---|---|
| 2024/0327144 | A1 | 10/2024 | Smith et al. | |
| 2024/0351802 | A1* | 10/2024 | Toro | B65G 47/918 |
| 2024/0359927 | A1* | 10/2024 | Li | B65G 61/00 |
| 2025/0197137 | A1* | 6/2025 | Toro | B65G 47/914 |

OTHER PUBLICATIONS

GB2318299.1, "Combined Search and Examination Report", Sep. 24, 2024, 7 pages.

U.S. Appl. No. 18/074,796, "Footprint Optimized Containerized Storage Solution", filed Dec. 5, 2022, 34 pages.

* cited by examiner

TRANSFER APPARATUS AND FAST, FOOTPRINT OPTIMIZED ITEM TRANSFER STATION

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space, equipment, and manpower, can result in lower throughput, unacceptably long response times, an ever-increasing backlog of unfinished tasks, and, in general, poor system performance. Additionally, once an inventory storage location has been filled to capacity with items and equipment, the cost of adding additional space or moving the items and equipment to a secondary location may be prohibitively expensive, limiting the ability of the location to accommodate additional items.

BRIEF DESCRIPTION OF THE DRAWINGS

Various embodiments in accordance with the present disclosure will be described with reference to the drawings, in which.

DETAILED DESCRIPTION

Figure 1:
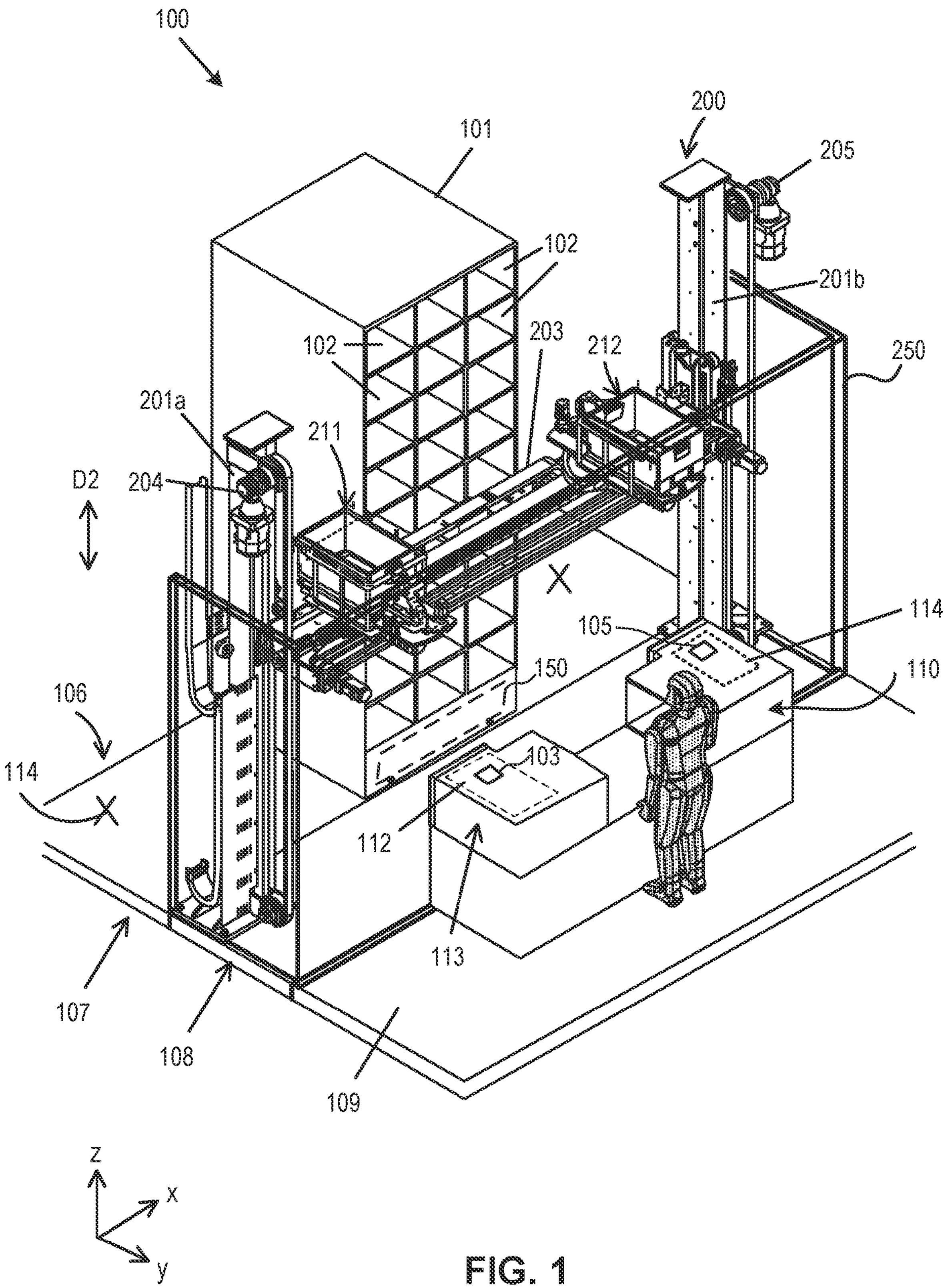
FIG. 1 illustrates a perspective view of an example of an inventory system in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein are directed to features that may be utilized in inventory systems for transporting and/or sorting items. Features may be included in a transfer apparatus and/or in inventory systems employing the transfer apparatus, for example. Items such as totes may be stored in inventory holder spaces. The inventory holders can include shelves and/or compartments for receiving items or containers with items therein. An inventory holder may be moved by a mobile drive unit that can move around a warehouse environment, for example. The transfer apparatus may transfer items from within a space of the inventory holders to a specified area (e.g., a pickup area or a delivery area) of a workstation or from workstation to specified spaces of the inventory holder.

In various embodiments, the inventory system may include a transfer apparatus for transferring items between an inventory holder and a workstation such that operators can ergonomically handle items quickly and with ease and comfort to improve overall efficiency of inventory handling within the inventory system. In various embodiments, the transfer apparatus may be positioned between the operators and the inventory holders. The transfer apparatus may include at least two heads, each of which can be rotated and translated to perform multiple item tasks simultaneously between operators and inventory holders. For example, two heads of the transfer apparatus can be independently rotated and independently translated laterally on a common or shared vertical axis. This may enable the associated workstation to be geometry agnostic and facilitate simultaneous pick and place of items, which can make the cycle time substantially shorter than a serial pick and place of the items. For example, one head can extract an item from the inventory holder (e.g., to prepare to deliver to a delivery area of a workstation) while another head can pick up a different item from a receiving area of the workstation (e.g., in preparation to transfer to the part of the inventory holder that was just unloaded by the first head).

As an illustrative example, the transfer apparatus may include a lateral frame, an upright frame, and two independently rotatable and translatable heads supported by the lateral frame. The lateral frame may extend in a first direction (e.g., horizontal direction). The upright frame may be arranged to guide the lateral frame and support movement of the lateral frame in a second direction (e.g., a vertical direction). A first head may be rotatably (e.g., about a vertical axis or z-axis) coupled to the lateral frame and may translate in and/or along the first direction (e.g., horizontal direction). The second head may be rotatably coupled to the lateral frame and may translate in and/or along the first direction. The second head can be spaced from the first head and may rotate and translate independently of the first head. Each head can also include a suction cup or other extractor that can be actuated to engage an item located on the head while the head is moving. The suction cup or other extractor can also extract the item from an inventory holder and/or from a receiving area of a work station.

Advantageously, as the transfer apparatus may transfer one item to or from the inventory holder and simultaneously may transfer another item to or from a workstation or vice-versa, inactive time and/or down time for the transfer apparatus may be reduced and lead to increased throughput of the inventory system, for example. Additionally, each head of the transfer apparatus may rotate approximately 180 degrees to switch between interfacing with an inventory holder and interfacing with a workstation (e.g., which may have a pickup area and a delivery area). Each head may rotate while maintaining positive control of the item within the respective head with a suction cup. As such, engagement of the items can be maintained without depending on a friction between the item and a conveyor roller/belt to ensure securely holding or transferring the item. The transfer apparatus may also transfer items directly between the heads to recycle an item back to the workstation (e.g., in an event of an error such as an over-height condition) and may be capable of performing such recycling without the need for an additional material handling equipment.

Referring now to the drawings, in which similar identifiers refer to similar elements, FIG. 1 illustrates a perspective view of an example of an inventory system 100, according to various embodiments. In the illustrated embodiment of FIG. 1, the inventory system 100 can include one or more inventory holders 101, a workstation 110, and a transfer apparatus 200 within a workspace 106. The inventory system 100 can move inventory items between one or more inventory holders 101 and the workstation 110. For example, the inventory system 100 can facilitate the entry, processing, and/or removal of inventory items from the inventory system 100 and the completion of other tasks involving the inventory items. In various embodiments, the workspace 106 can represent a portion of or all of the floor of a warehouse environment in which the inventory system 100 operates.

The inventory holder 101 of the inventory system 100 may operate within a first space 107 (e.g., moved by a mobile drive unit 150, for example), the operators can work in a second space 109 where the workstation 110 is located, and the transfer apparatus 200 can be operated in a third space 108 between the first space 107 and the second space 109. In various embodiments, a partition screen 250 may be positioned between the transfer apparatus 200 and the workstation 110. The partition screen 250 may serve as a safety barrier between the inventory holders 101, the transfer apparatus 200, and an operator at the workstation 110. The inventory system 100 may be arranged so that the operators do not have direct access to the inventory holders 101, rather the transfer apparatus 200 transfers items to/from the operator at an ergonomic and/or comfortable level (e.g., waist level). As such, the transfer apparatus 200 may facilitate ergonomic handling of the items. For example, the inventory system 100 may be arranged so that an operator does not have to climb a ladder and retrieve/deliver items from/to inventory holder 101, bend down to pick up items, carry items while on a ladder, or engage in other undesirable item handling operations.

Figure 2:
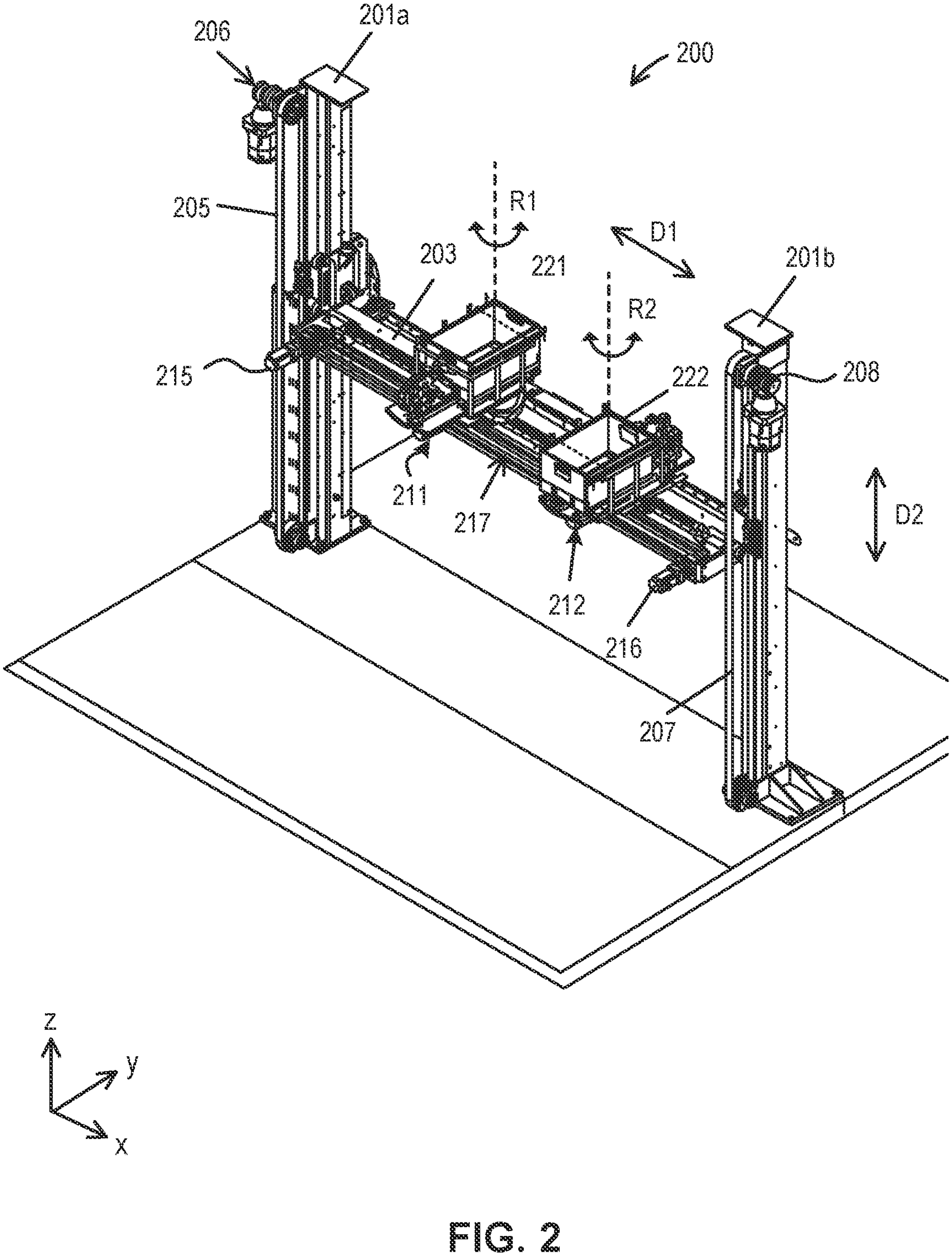
FIG. 2 illustrates a perspective view of an example transfer apparatus that may be utilized in the inventory system shown in FIG. 1 in accordance with various embodiments.

Referring now to FIG. 1 and FIG. 2, the transfer apparatus 200 includes an upright frame 201*a*, 201*b* (collectively referred as 201), a lateral frame 203, and at least two rotatable heads, e.g., a first rotatable head 211 and a second rotatable head 212. The lateral frame 203 may extend in or along a first direction D1 (e.g., a horizontal direction or x-axis) within the third space 108. The upright frame 201 may be arranged to guide and support movement of the lateral frame 203 in or along a second direction D2 (e.g., a vertical direction or z-axis). The first rotatable head 211 may be supported by the lateral frame 203. The first rotatable head 211 can rotate about an axis (e.g., z-axis) perpendicular to the lateral frame 203 and translate along the lateral frame 203 in the first direction D1. This rotation and translation movement can be performed independently or simultaneously. The second rotatable head 212 may be similar to the first rotatable head 211 and spaced from the first rotatable head 211 along the lateral frame 203. The second rotatable head 212 can rotate about the z-axis and translate along the lateral frame 203 in the first direction D1. This rotation and translation movement can also be performed independently or simultaneously. Furthermore, the second rotatable head 211 can rotate and translate independently of the first rotatable head 212. The heads 211, 212 can be moved simultaneously to facilitate faster item transfer compared to serial movements. Additionally, the first head 211 and the second head 212 can also include an extractor extendible in or along a third direction (e.g., y-direction) to extract or deliver items in or along a third direction (e.g., y-direction).

During item transfer, the rotatable heads 211 and 212 can rotated and translated independently of each other to facilitate fast item transfer. The rotatable heads 211 and 212 can be vertically aligned to the inventory holder 101 or the workstation 110 by moving the lateral frame 203 along the upright frame 201. By such movement, the rotatable heads 211 and 212 can be vertically aligned with the workstation 110 to pick up or deliver an item, for example. The rotatable heads 211 and 212 can be vertically aligned to reach different levels of the inventory holder 101. The first rotatable head 211 and the second rotatable head 212 can interface with the workstation 110 on one side or the inventory holder 101 on an opposite side during item transfer. The first rotatable head 211 and the second rotatable head 212 can independently and simultaneously operate between the inventory holder 101 and the workstation 110. By moving of the lateral frame 203 to a level of the workstation 110, the transfer apparatus 200 can facilitate ergonomic positioning and easy handling of items by the operators. In some embodiments, the workstation 110 can be further configured to include additional item handling components for ease of item handling.

In the illustrated embodiment, in FIG. 1, the workstation 110 may be a receiving station from which a first item 103 may be picked up, and the same item 103 or a second item 105 may be delivered. The workstation 110 may include a first conveyor 112 at a first area (e.g., a pickup area) where the first item 103 can be picked up by a head. The workstation 110 may also include a second conveyor 114 arranged for receipt of the second item 105 at a second area (e.g., a delivery area). The second area may be laterally opposite to the first area of the workstation 110. In the example shown, an operator may manually place the first item 103 on the first conveyor 112 to be picked up and delivered to the inventory holder 101 by the first head 211. Also, the operator may pick up the delivered second item 105 from the second conveyor 114. In some embodiments, either or both of the receiving area 112 and the delivery area 114 may be at a different height than illustrated. For example, the receiving area 112 and/or the delivery area 114 may be at a ceiling, close to top of the inventory holder 101, or other specified heights. Arranging at an elevated height may facilitate interoperability with ceiling-hung conveyors or other conveyance and/or robotic systems that may be utilized to move items within the system, for example. The present disclosure is not limited to manual handling of items and appropriate robotic operators and/or systems (e.g., conveyor or a pickup robot) may be used.

The transfer apparatus 200 can provide Cartesian and rotational degrees of freedom for simultaneous items transfer. This may reduce inactive time and/or facilitate an optimized workspace design among other advantages. The upright frame 201 and the lateral frame 203 of the transfer apparatus 200 may facilitate movement of the heads 211 and 212 to a specified Cartesian coordinate (e.g., (x, z) position indicating at particular x-axis locations and particular z-axis locations). For example, an x-location may correspond to a pickup area where the first conveyor 112 is located, another x-location may correspond to a delivery location where the second conveyor 114 is located, a further x-location may correspond to a column or other position along the inventory holder 101, a z-location may correspond to a workstation level, another z-location may correspond to a level of the inventory holder 101, or other specified locations. Furthermore, the rotational capabilities of the rotatable heads 211 and 212 may provide additional degree of movement e.g., rotation about z-axis. The rotation movement can advantageously account for situations in which the inventory holder 101 may not be statistically orthogonal to the transfer apparatus. For example, the heads can rotate up to 3.3 degrees past the nominal orthogonal rotation to align with a slightly rotated inventory holder 101. These Cartesian and rotational degrees of freedom may enable items to be moved within a three-dimensional space using a combination of Cartesian movements and rotational movements. Accordingly, items can be moved via a shorter distance at a fast pace compared to a set of linear movement between two point within the workspace 106. Additionally, as the heads of the transfer apparatus 200 can be rotated, the third space 108 occupied by the transfer apparatus 200 can be smaller compared to other transfer apparatuses that do not include rotatable heads. For example, the heads can be sized to only accommodate one tote. For example, a length of the head may be equal or approximately equal to a length of the tote, or twice a length of the tote, which is significantly less than three times a tote length as may be present in some tote handlers. Accordingly, the rotatable heads 211, 212 of the transfer apparatus 200 may allow operation of the heads in a (circular) envelope that permits the inventory holder and the workstation to be less than or equal to two times the length of the item apart.

In various embodiments, the inventory holder 101 can store inventory items of the inventory system 100. For example, the inventory holder 101 may correspond to a dense tote pod. A dense tote pod may include spaces of approximately equal sizes to receive multiple totes or storage bins. Each space can be sized to receive a tote capable of holding one or more types of inventory items. The inventory holders 101 can include one or more spaces 102 (e.g., cubbies, shelves, slots, etc.) that can receive one or more types of inventory items (e.g., a tote). The inventory holders 101 may include items within totes, boxes, bags, or other forms of containers.

The inventory items may represent any objects suitable for storage, retrieval, and/or processing in the inventory system 100. For example, inventory items may be totes or storage bins. The inventory items may include one or more objects of a particular type that are stored in a tote or a storage bin of the inventory system 100. In further embodiments, a particular inventory holder 101 can store a particular inventory item if the inventory holder 101 currently holds one or more of the same item type.

Turning to a particular example, the inventory system 100 can represent a mail-order or other order-fulfillment warehouse facility, and inventory items can represent merchandise stored in the warehouse facility. During operation, a mobile drive unit 150 (see FIG. 4) can carry an inventory holder 101 comprising one or more inventory items that are requested in an order to be packed for delivery to a customer. Alternatively or additionally, the inventory holder 101 may contain aggregated collections of inventory items for shipment. Moreover, in particular embodiments of the inventory system 100, boxes containing completed orders may themselves represent inventory items.

In some embodiments, the workspace 106 can include locations designated for the completion of particular tasks involving inventory items. For example, the tasks can include the removal of inventory items from the inventory holders 101, the introduction of inventory items into the inventory holders 101, the counting of inventory items in the inventory holders 101, the decomposition of inventory items (e.g., separating from pallet-sized or case-sized groups into individual inventory items), the consolidation of inventory items between the inventory holders 101 and/or the workstation 110, and/or the processing or handling of inventory items in any other suitable manner.

In some embodiments, one or more workspaces 106 can represent a location at which the inventory system 100 is externally accessible by human operator(s) and/or robotic system(s) external to the inventory system 100. In some embodiments, the workspace 106 can be externally bounded by walls and/or a fence to prevent or limit access to the workspace 106 by human operator(s) (e.g., a structured environment), and each workspace 106 may be arranged at a respective opening in the walls or fence. In some embodiments, the workspace 106 is not externally bounded (e.g., an unstructured environment).

Although FIG. 1 shows, for the purposes of illustration, an embodiment of the inventory system 100 in which the workspace 106 includes a fixed, predetermined, and finite physical space, particular embodiments of the inventory system 100 may include inventory holders 101, additional transfer apparatus, and operators that are configured to operate within a workspace 106 that is of variable dimensions and/or of an arbitrary geometry. Similarly, while FIG. 1 illustrates a particular embodiment of the inventory system 100 in which the workspace 106 is entirely enclosed in a warehouse environment, alternative embodiments can utilize the workspace 106 in which some or all of the workspace 106 is located, for example, outdoors, within a vehicle (such as a cargo ship), and/or otherwise unconstrained by any fixed structure.

In various embodiments, components (e.g., heads and lateral frame) of the inventory system 100 can communicate using IEEE 802.11, Bluetooth, or Infrared Data Association (IrDA) standards, or any other appropriate wireless or wired communication protocol. Additionally or alternatively, the inventory system 100 can include tracks or other guidance elements upon which the mobile drive units 150 can be wired to facilitate communication between the mobile drive units 150 used to move the inventory holders 101. In general, the mobile drive units 150 for moving the inventory holders 101 can be powered, propelled, and controlled in any manner appropriate based on the configuration and characteristics of the inventory system 100.

FIG. 2 through FIG. 5 further illustrate examples of components and dimensioning of the transfer apparatus 200 that provides several Cartesian and rotational degrees of freedom and facilitates workspace optimization. As shown, the upright frame 201 includes two vertical columns 201*a* and 201*b* spaced apart from each other by a length L (see FIG. 3) equal to or greater than a length of an inventory holder 101. The columns 201*a* and 201*b* has a height H1 (see FIG. 3), which can be approximately equal to or greater than a height of the inventory holder 101 so that the heads can be raised to a level of a top space of the inventory holder 101. The columns 201*a* and 201*b* may be fixed to the ground to provide structural support to connected components. Each of the vertical column 201*a* and 201*b* can include a translation system to support and guide the lateral frame 203 along the second direction D2 (e.g., vertical direction or z-axis). For example, the translation system may include a motor driven belt and pully mechanism, rack and pinion, a ball screw, a motor driven gear system, hydraulically actuated piston cylinder arrangement, or other translations systems without limiting the scope of the present disclosure. In some embodiments, the belt and pully may provide greater vertical range of movement within a specified vertical dimension compared to other linear translation systems (e.g., cylinder piston arrangement).

Figure 3:
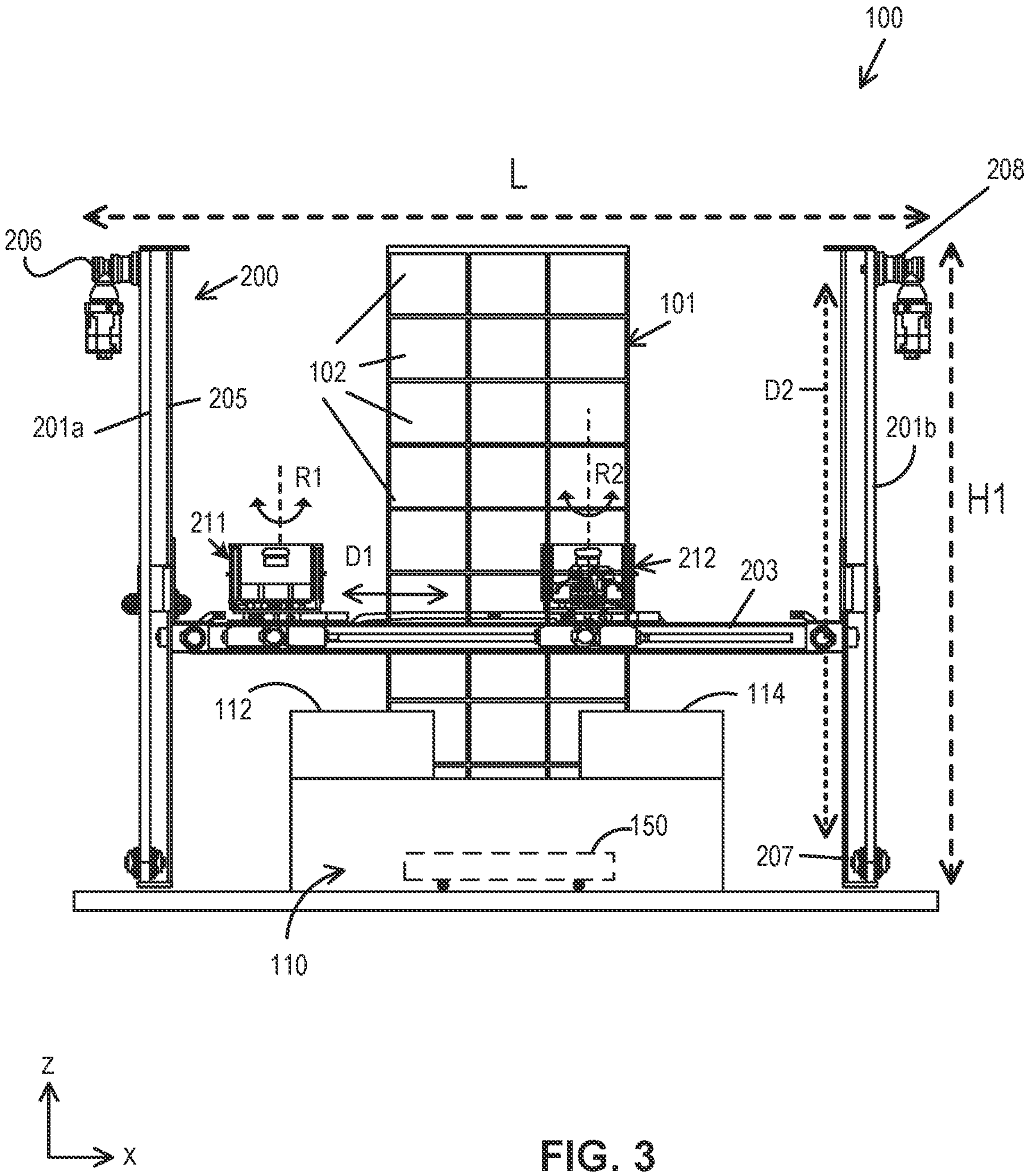
FIG. 3 is an elevation view of the transfer apparatus of FIG. 2.

In the illustrated embodiment, each of the columns 201*a* and 201*b* include a motor drive belt and pulley arrangement. For example, as shown in FIG. 2 and FIG. 3, the columns 201*a*, 201*b* may be coupled to belts 205, 207 extending in a vertical direction and wrapped around pulleys mounted on a top portion and a bottom portion of the respective columns. The pulleys may be motor driven. For example, top pulleys may be driven by motors 206, 208 causing the belts to move.

The lateral frame 203 may be coupled to the column 201*a* and/or the belt 205 at one end and/or may be coupled to the column 201*b* and/or the belt 207 at the other end. The belts 205 and/or 207 can drive the lateral frame 203 in the vertical direction by controlling the direction of rotation of the motors 206 and 208. The columns 201*a* and/or 201*b* can provide structural support and guide the vertical movement of the lateral frame 203 so that the lateral frame 203 remains substantially horizontal as it move up and down. For example, guides or rails extending along the columns 201*a* and 201*b* may be provided and complementary structure (e.g., including flange, rollers, etc.) may be provided at the lateral frame 203 interfacing with the columns 201*a*, 201*b* so that the lateral frame 203 can slide without disengaging from the upright frame 201.

Figure 4:
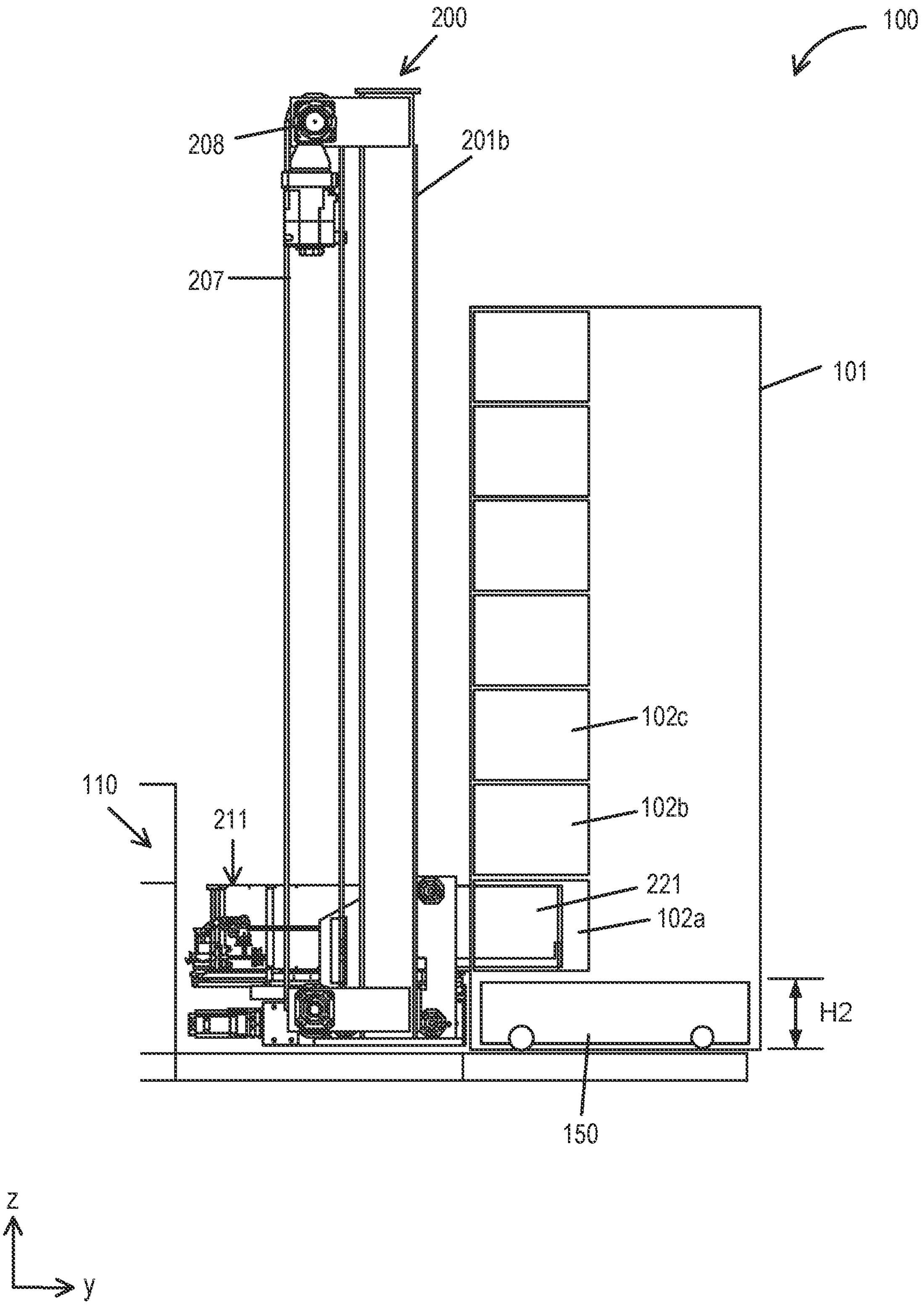
FIG. 4 is a side view of the transfer apparatus of FIG. 2.

FIG. 4 illustrates an example interfacing of a rotatable head (e.g., the first head 211) of the transfer apparatus 200 with the inventory holder 101. The inventory holder 101 may include multiple spaces 102 (e.g., individually referred as 102*a*, 102*b*, 102*c*, etc.) sized to store an item 221 (e.g., a tote). The lowest height of the space e.g., 102*a* can be at a distance H2 (e.g., approximately 1 foot or more) above the ground. The spaces may be distributed in a vertical direction (e.g., along z-axis) and horizontal direction (e.g., along x-axis see FIG. 3). The rotatable heads 211, 212 of transfer apparatus 200 can reach each of the spaces 102 of the inventory holder 101 to deliver or extract an item therein. For example, the lateral frame 203 supporting the rotatable head 211 can be moved to the lowest level at the height H2 of the inventory holder 101 and the rotatable head 211 can be aligned with the space 102*a*. The head 211 can further extend along y-axis to deliver an item or extract an item from the space 102*a*. Similarly, the lateral frame 203 may be moved up to align the heads 211, 212 with a level of the specified space 102 of the inventor holder 101, and the heads 211, 212 can be rotated and/or translated to interface with a specified space 102. Similarly, the heads 211, 212 can be aligned vertically (e.g., along z-axis) and laterally (e.g., along x-axis) with the specified area (e.g., the pickup area or delivery area) of the workstation 110.

Figure 5:
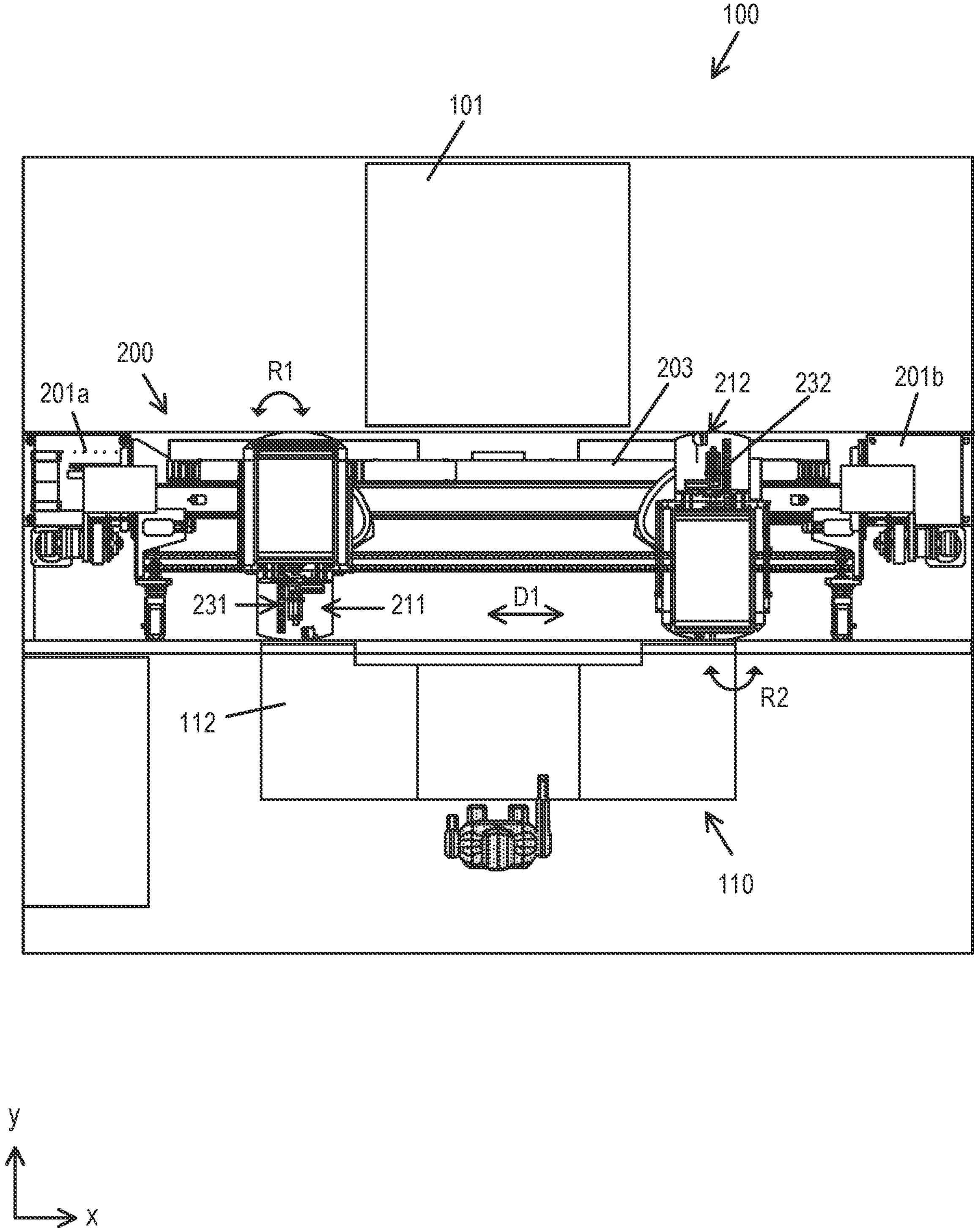
FIG. 5 is a plan view of the transfer apparatus of FIG. 2.

FIG. 5 illustrates an example lateral positioning of the heads 211 and 212 relative to the inventory holders 101 and the workstation 110. The heads 211, 212 can be moved independently of each other in the x-y plane by laterally moving them in the first direction D1 and rotating in them in directions R1 and R2. For example, the heads 211 and 212 can be moved laterally (e.g., in x-direction) away from each other to position at the first area 112 and the second area 114, respectively. Further, the heads 211 and 212 may be rotated in the directions R1 and R2 to position the heads 211, 212 for interfacing with the inventory holder 101 or the workstation 110. In the illustrated position, the first rotatable head 211 may be rotated to interface with the inventory holder 101, and the second rotatable head 212 may be rotated to interface with the workstation 110. As mentioned earlier, the rotational capability of the heads 211, 212 in conjunction with translation capabilities may enable heads 211, 212 to be sized for handling one tote, e.g., so that size and weight of the heads 211, 212 can be minimized.

Figure 6:
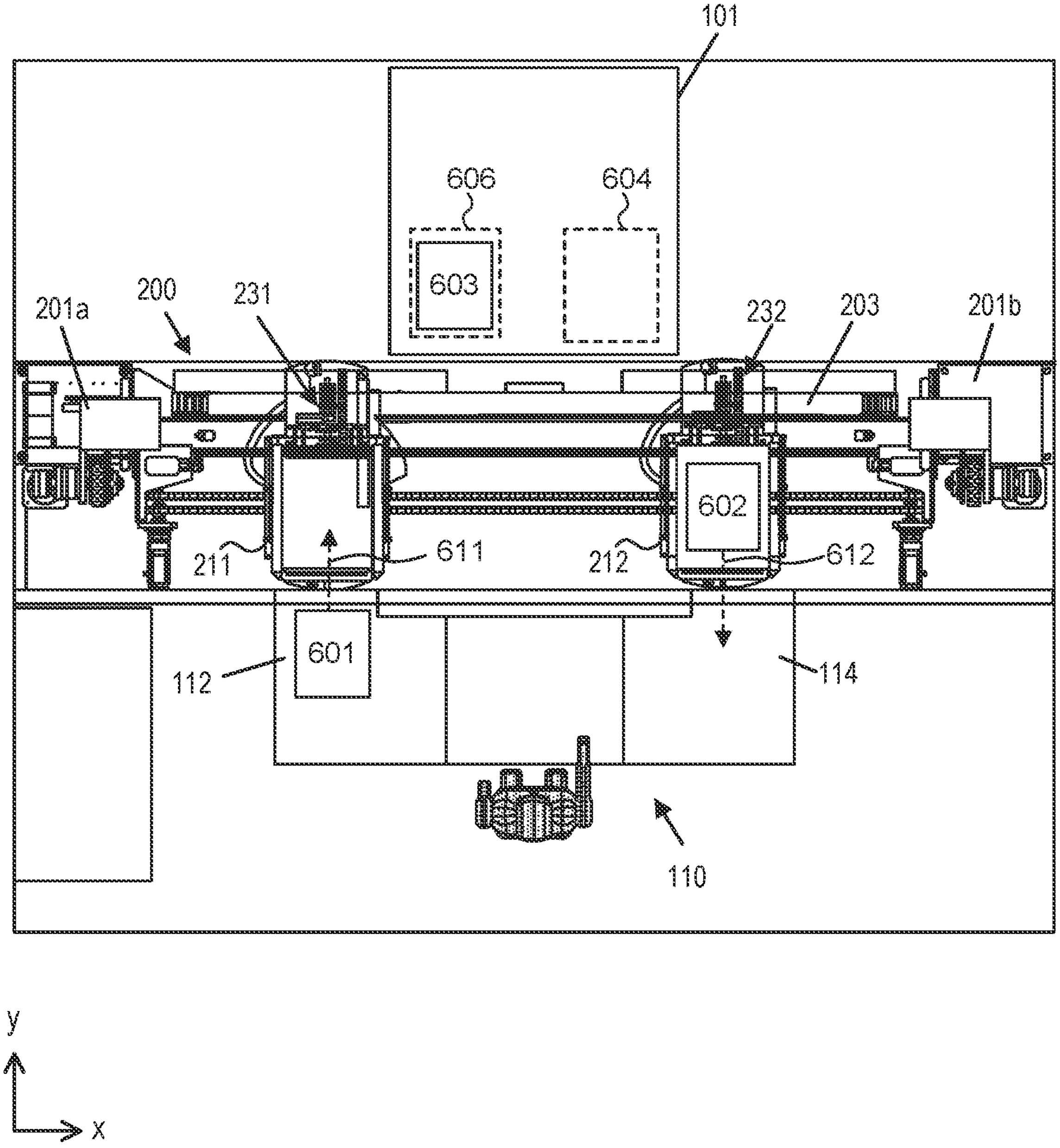
FIG. 6 illustrates simultaneous transferring of items at a receiving station, in accordance with various embodiments.
Figure 7A:
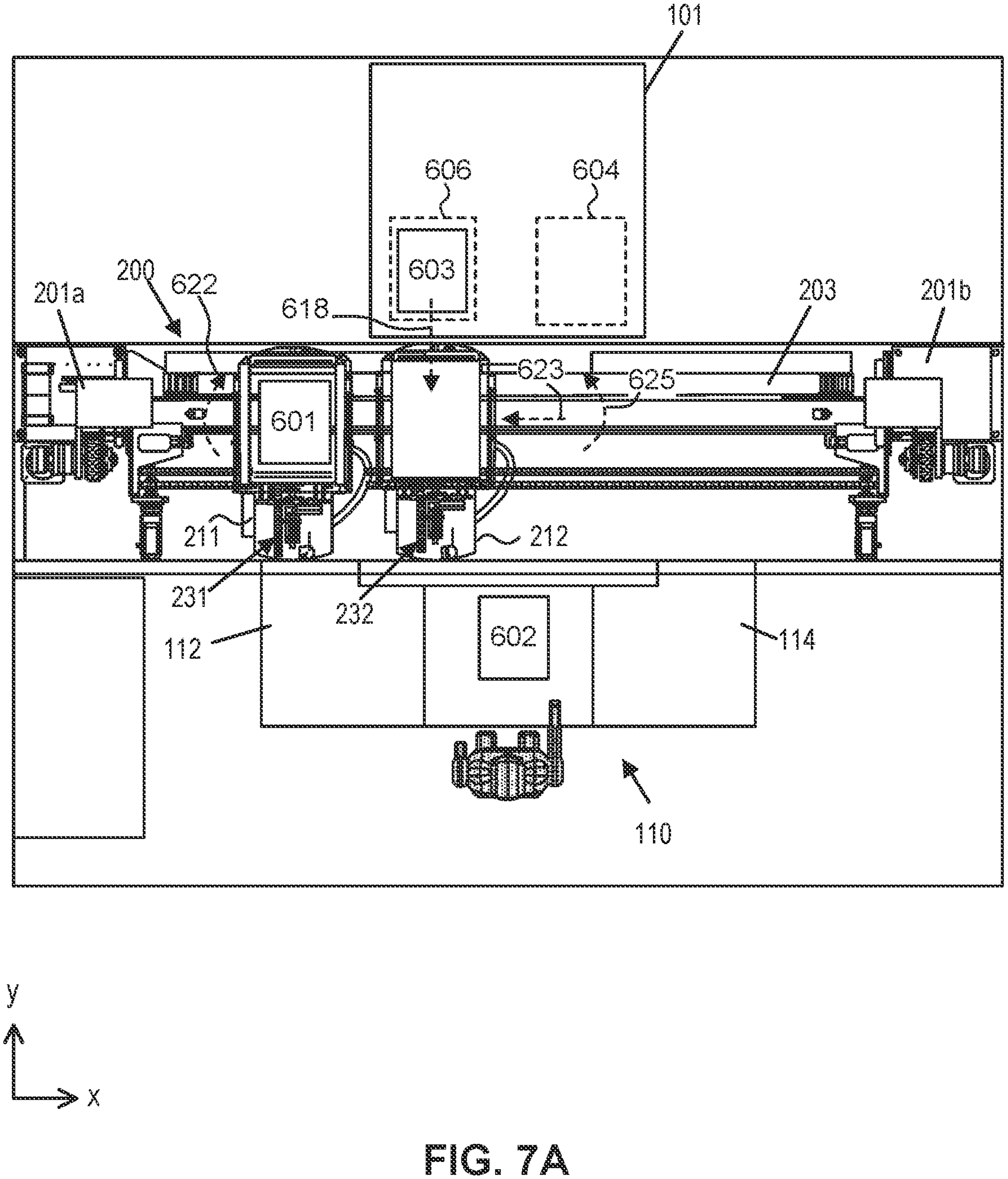
FIG. 7A illustrates another item transfer step following the step shown in FIG. 6.
Figure 7B:
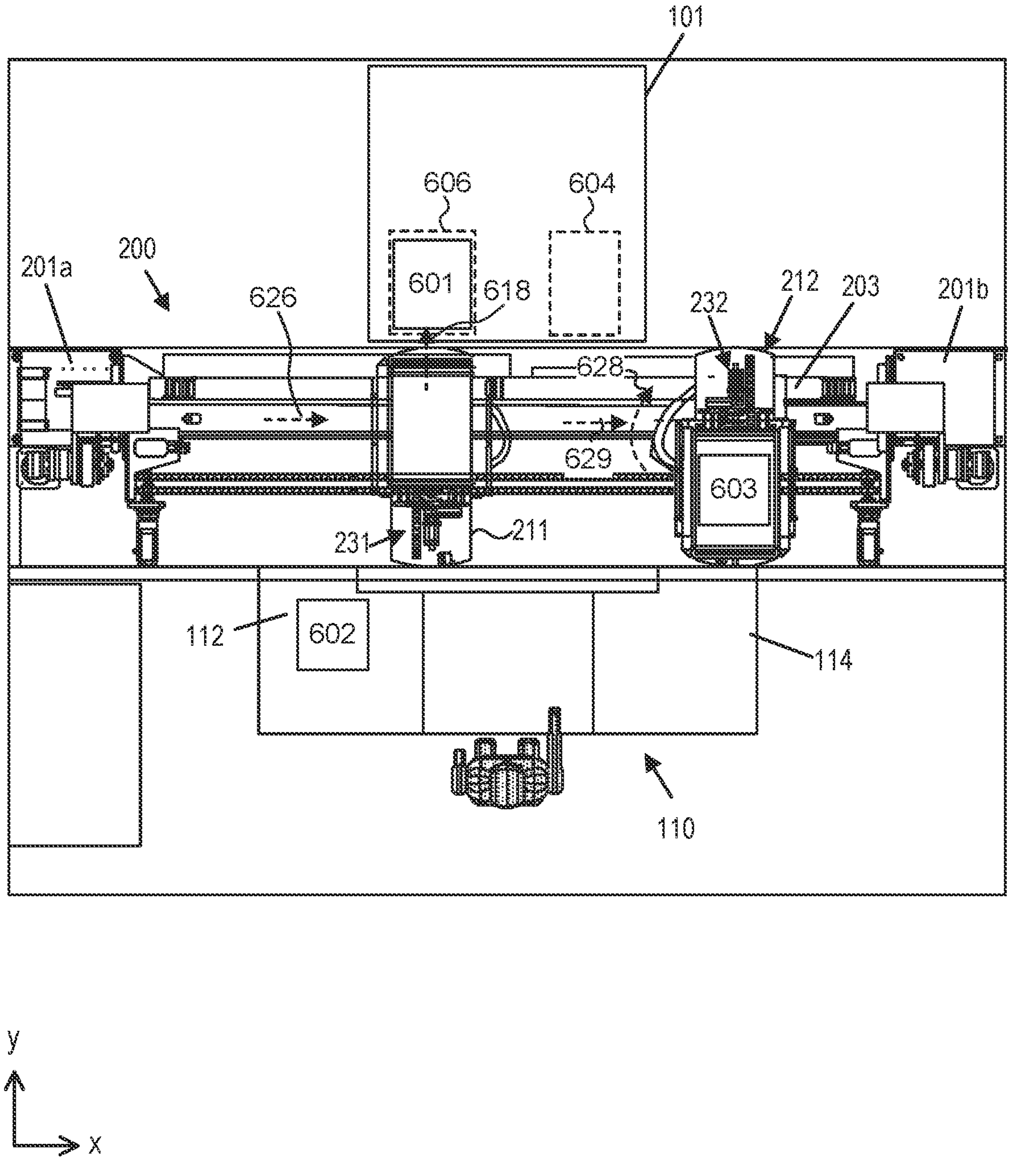
FIG. 7B illustrates an item transfer process of storing the item retrieved from the receiving station in FIG. 6 into an inventory holder.

FIGS. 6, 7A, and 7B illustrate example stages in an item transferring process or method using the transfer apparatus 200. Initially, the first head 211 and the second head 212 may be positioned at any location or home location e.g., at the first area 112 and the second area 114 (e.g., as shown in FIG. 5), and may or may not be vertically aligned with the workstation 110. The transfer apparatus 200 may be instructed (e.g., via a controller (e.g., 1600 in FIG. 16), which may be configured to manage item transfer) to transfer a first item 601 and a second item 602. The transfer instructions may include source and destination of the items to be transferred. An inventory holder 101 may include spaces 604 and 606 (which may be examples of spaces 102). The spaces 604 and 606 may be at same or different vertical locations in the inventory holder 101. In the state shown, the second item 602 may have been accessed from the space 604, and the space 606 may include a third item 603.

As one example, a task may include transfer the first item 601 to a specified space (e.g., 606) of the inventory holder 101 from a pickup location 112. As another example, a task may include transferring the second item 602 from the inventory holder 101 to a delivery area 114. In the illustrated instance of item transfer, the transfer apparatus 200 can efficiently transfer the items 601 and 602 simultaneously. The heads 211, 212 may be independently rotated to interface with the workstation 110 and moved to simultaneously exchange items 601 and 602 at the workstation 110. For example, the first head 211 may receive a first item 601 from the first area 112 while the second head 212 delivers a second item 602 to the second area 114. This simultaneous retrieval and delivery of the items 601 and 602 can advantageously save time and facilitate faster item exchange compared to a serial item transfer. Example item transfer steps are further discussed in detail below.

In some embodiments, an operator (or a robot) may place the first item 601 at the receiving area or pickup area (e.g., on the first conveyor at 112). The first head 211 can be rotated in a clockwise or counter-clockwise direction (e.g., direction R1) towards the workstation 110. Before or after rotating, the first head 211 can be vertically aligned with the first item 601 (e.g., by vertically moving the lateral frame 203 along the upright frame 201). When suitably aligned vertically, laterally, and rotationally, the first head 211 may actuate an extractor 231 (further examples of which may be seen in FIG. 13) to extend in a y-direction and pull the first item 601 onto the first head 211 from the pickup area 112 of the workstation 110 (e.g., as illustrated by arrow 611). Simultaneously while operating the first head 211, the second head 212 carrying the second item 602 may be moved (e.g., by rotating and/or translating) to align for delivery of the second item to the delivery area 114. When suitably aligned vertically, laterally, and rotationally, the second head 212 may actuate its extractor 232 to extend in y-direction and deliver the second item 602 onto the delivery area 114 of the workstation 110 (e.g., as illustrated by arrow 612).

Referring to FIG. 7A, upon retrieving the first item 601 onto the first head 211, the first head 211 may be rotated by 180° in a clockwise (or counter-clockwise) direction to face the inventory holder 101 (e.g., as illustrated by arrow 622). Simultaneously and/or similarly, the second head 212 may be rotated by 180° in a clockwise (or counter-clockwise) direction to face the inventory holder 101 (e.g., as illustrated by arrow 625) and translated along D1 (as illustrated by arrow 623) to reach an x-position corresponding to the space 606, for example, in which the third item 603 may be present. Further, the second head 212 may be vertically aligned (e.g., along z-axis) to face the space 606. When suitably aligned, vertically, laterally, and rotationally, the second head 212 may actuate its extractor 232 to extend in the y-direction and extract the third item 603 to create an empty space 606. Accordingly, the space 606 may be available for storing the first item 601. In one example, while the heads 211, 212 are operating relative to the inventory holder 101, an operator may move the second item 602 from the delivery area 114 to another location on the receiving station 110.

Referring to FIG. 7B, the first head 211 may be moved laterally along a direction D1 (e.g., as illustrated by arrow 626) to arrive at an x-location corresponding to the space 606. In conjunction (e.g., at the same time and/or within a suitably near timeframe), the second head 212 may be moved away laterally along the direction D1 (e.g., as illustrated by arrow 629). When suitably aligned vertically, laterally, and rotationally, the first head 211 may actuate its extractor 231 in y-direction and place the first item 601 in the specified space (e.g., 606) of the inventory holder 101 (e.g., as illustrated by arrow 618). The specified space 606 may be an empty space created after extracting an item therefrom (e.g., the third item 603 in FIG. 7A)). In another example, the specified space 606 may be a previously empty space (such as space 604).

Additionally or alternatively, the second head 212 may be rotated to face the delivery area 114 (e.g., as illustrated by arrow 628). Additionally or alternatively, the second item 602 may be replenished and/or moved to the pickup area 112 to circulate the second item 602 to the inventory holder 101.

Upon transferring the first item 601, the lateral frame 203 may be moved vertically (e.g., along z-axis) to align the heads 211, 212 with the receiving station 110 e.g., to arrive at a state similar to that shown in FIG. 6. Once appropriately aligned, item transfer steps similar to that discussed with respect to FIG. 6 may be performed. For example, the heads 211, 212 may be operated to simultaneously retrieve the second item 602 and deliver the third item 603. Accordingly, the transfer apparatus 200 can facilitate efficient item transfer to achieve a specified item transfer rate. When such item transfer steps are repeated to transfer several items, a significant amount of process time may be saved.

Another set of example steps of item transfer process include instructing (e.g., via a mobile drive unit) a specified inventory holder to arrive at a transfer apparatus (e.g., 200). Using one head of the transfer apparatus, a tote may be extracted from a space of the specified inventory holder to create an empty space therein. Using another head of the transfer apparatus, another tote may be inserted in the empty space. Upon transferring the items, the controller may communicate to release the specified inventory holder and the heads of the transfer apparatus may be positioned at receiving and delivery areas, respectively. Further, simultaneous pick up and placing of items at the workstation may be performed, e.g., followed by returning the heads to subsequent inventory holders.

The translation direction and the distance to be travelled by each of the heads 211, 212 may depend on their current position and the specified locations at the inventory holder 101 or the workstation 110. In some embodiments, the current positions of the heads 211, 212 may be tracked in real-time. A controller (e.g., 1600 in FIG. 16) can then determine the direction and distance of travel of each of the heads 211, 212 to avoid collision with each other. Furthermore, the extractor 231, 232 of each head 211, 212 may include an engagement feature (e.g., a suction cup) that can stay positively engaged with the items 601, 602, 603, etc. while the heads 211, 212 move (e.g., in rotation and/or translation).

In the above transfer process, several movements of the lateral frame 203 may be performed. For example, the lateral frame 203 may be moved along a vertical direction to vertically align the first head 211 towards the first area 112 of the workstation 110. The lateral frame 203 may be moved along the vertical direction to vertically align the first head 211 towards a specified level of the inventory holder 102. The lateral frame 203 may be moved along the vertical direction to vertically align the second head 212 towards the second area 114 of the workstation 110. The lateral frame 203 may be moved along the vertical direction to vertically align the second head 212 towards another specified level of the inventory holder 101. The present disclosure is not limited to steps illustrated in FIG. 6, FIG. 7A, and FIG. 7B and appropriate rotation, translation and vertical movements may be initiated at specified times in an item transfer process to facilitate efficient item transfer.

Figure 8:
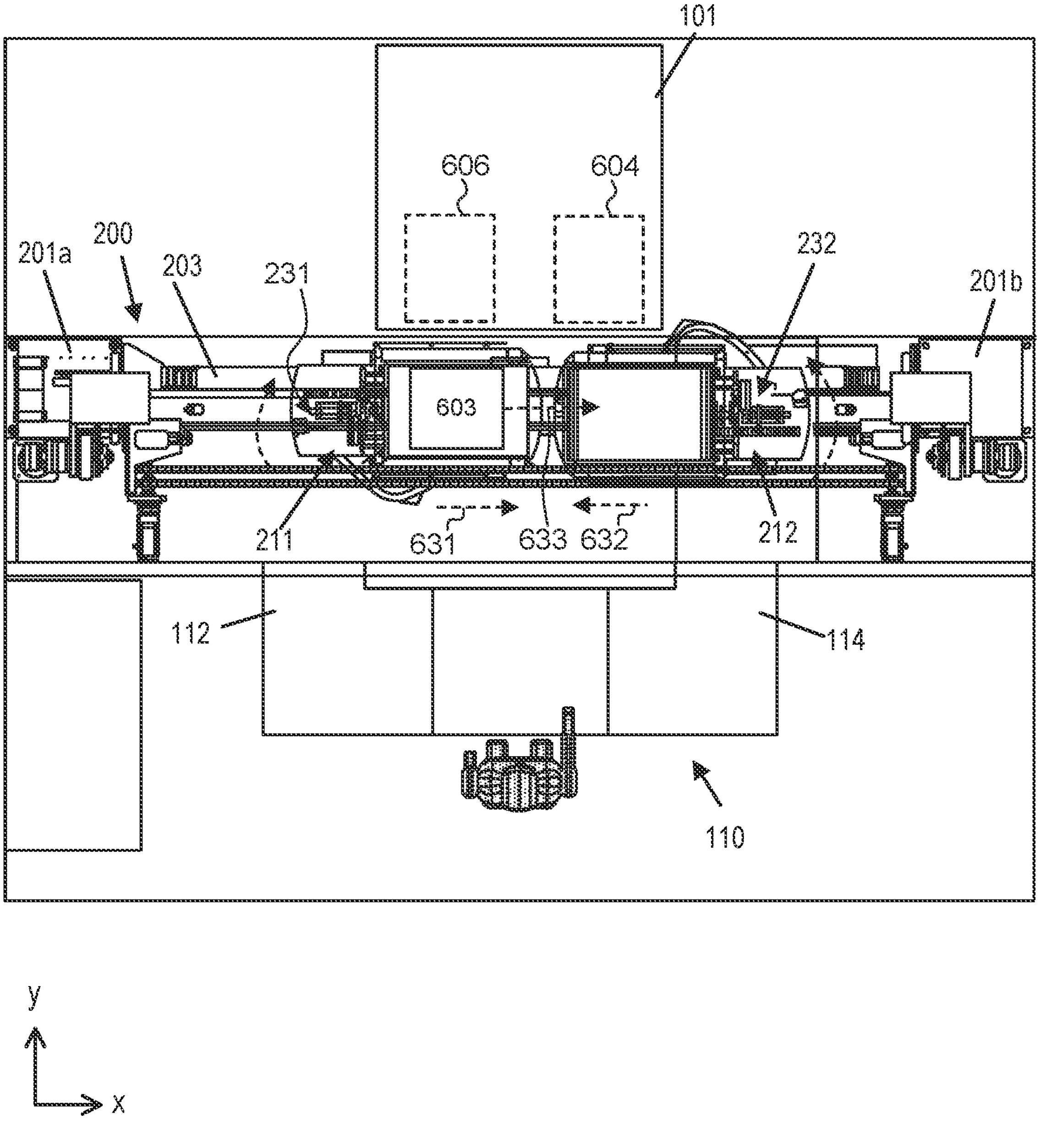
FIG. 8 illustrates an arrangement for head-to-head item transfer using the transfer apparatus of FIG. 2, in accordance with various examples.

Referring to FIG. 8, an item transfer process may involve transferring an item 603 between heads 211, 212. For example, the item 603 can be beneficially returned to a delivery area instead of storing it in the inventory holder 101. Also, such head-to-head item transfer can eliminate a need for a pass through conveyor or additional components to circulate an item from a pickup area to a delivery area. As non-limiting examples, an item may be defective or may not match criteria for delivery to the inventory holder 101. In such cases, an item transfer may be advantageously performed between the first head 211 and the second head 212 without interfacing with the inventory holder 101. For example, an operator may indicate the item 603 is to be returned. The to-be-returned item 603 may be received by the first head 211. The first head 211 and the second head 212 may be rotated by 90° towards each other and further translated towards each other, e.g., as illustrated by arrows 631 and 632. When the heads 211, 212 are within suitable proximity to each other, the item 603 may be transferred from the first head 211 to the second head 212, e.g., by operation of an extender 231 or otherwise as illustrated by arrow 633. Further, the second head 212 may be rotated towards the workstation 110 and translated towards the delivery area to deliver the item 603 to be carried away.

Figure 9:
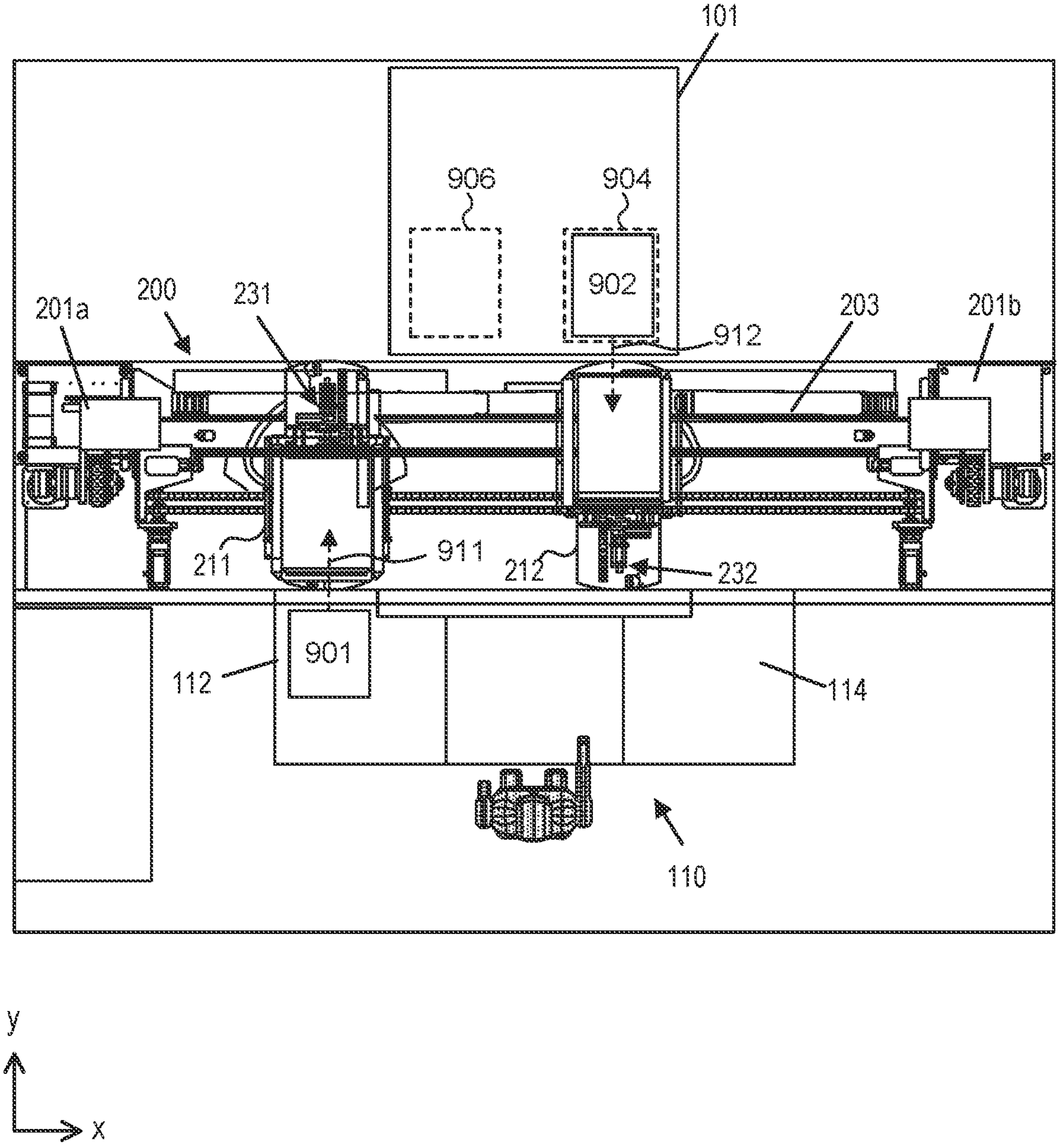
FIG. 9 illustrates an item transfer process involving heads of the transfer apparatus of FIG. 2 simultaneously interfacing with the receiving station and an inventory holder, in accordance with one example.

FIG. 9 illustrates another example item transfer process. In the illustrated example, the heads 211, and 212 may be rotated in opposite directions to simultaneously interface with the workstation 110 and the inventory holder 101. The inventory holder 101 may include spaces 904 and 906 which may be empty spaces or include an item (e.g., 902) stowed therein. In some embodiments, the first head 211 can be rotated and moved toward the receiving area 112 of the workstation 110. Similarly, the second head 212 can be rotated and moved toward a specified space (e.g., 904) of the inventory holder. The first head 211 may retrieve an item 901 from the receiving area 112 (e.g., e.g., as illustrated by arrow 911) and the second head 212 may extract another item 902 from the space 904 of the inventory holder 101 (e.g., as illustrated by arrow 912). Vertical movement of the lateral frame 203 may occur in between operations of the heads 211, 212 and/or the heads 211, 212 may operate simultaneously to efficiently perform the item transfer process. Accordingly, the items 901 and 902 can be transferred quickly compared to serial item transfer operations.

Figure 10:
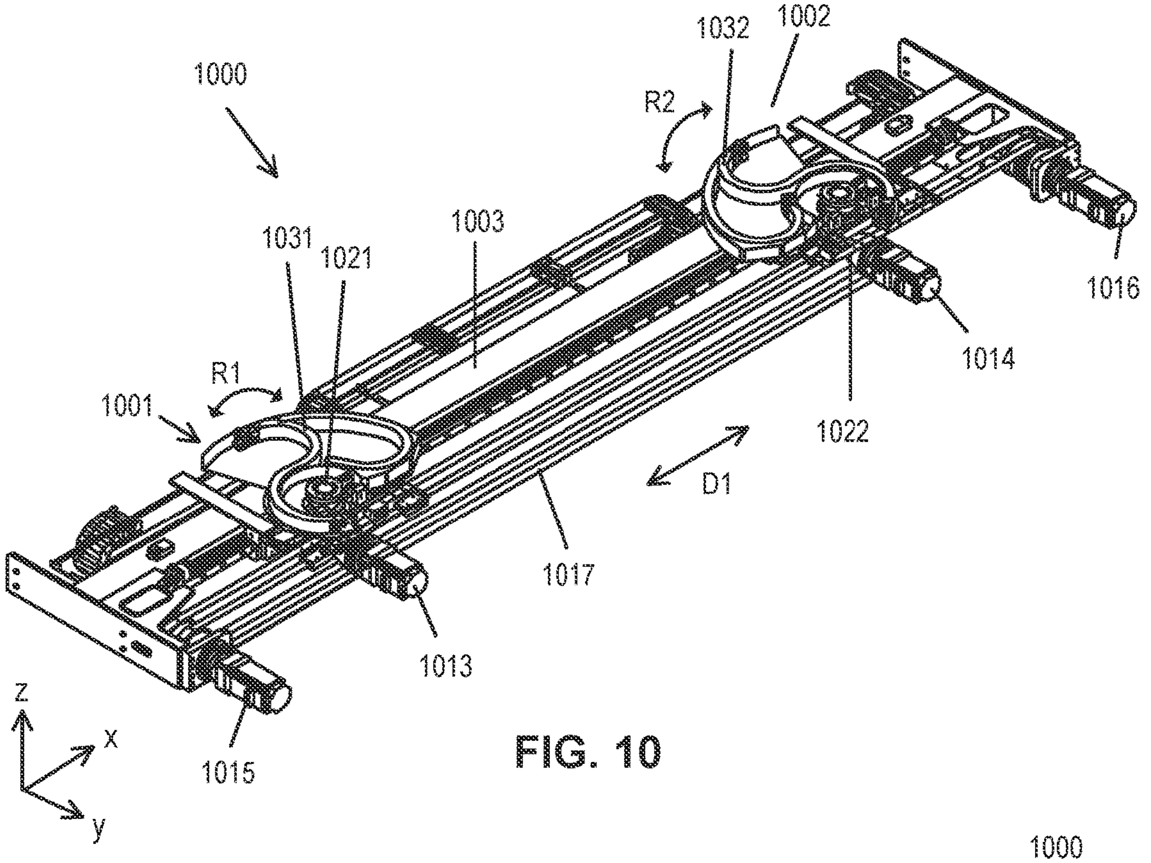
FIG. 10 is a perspective view of an example of a lateral frame of FIG. 2.
Figure 11:
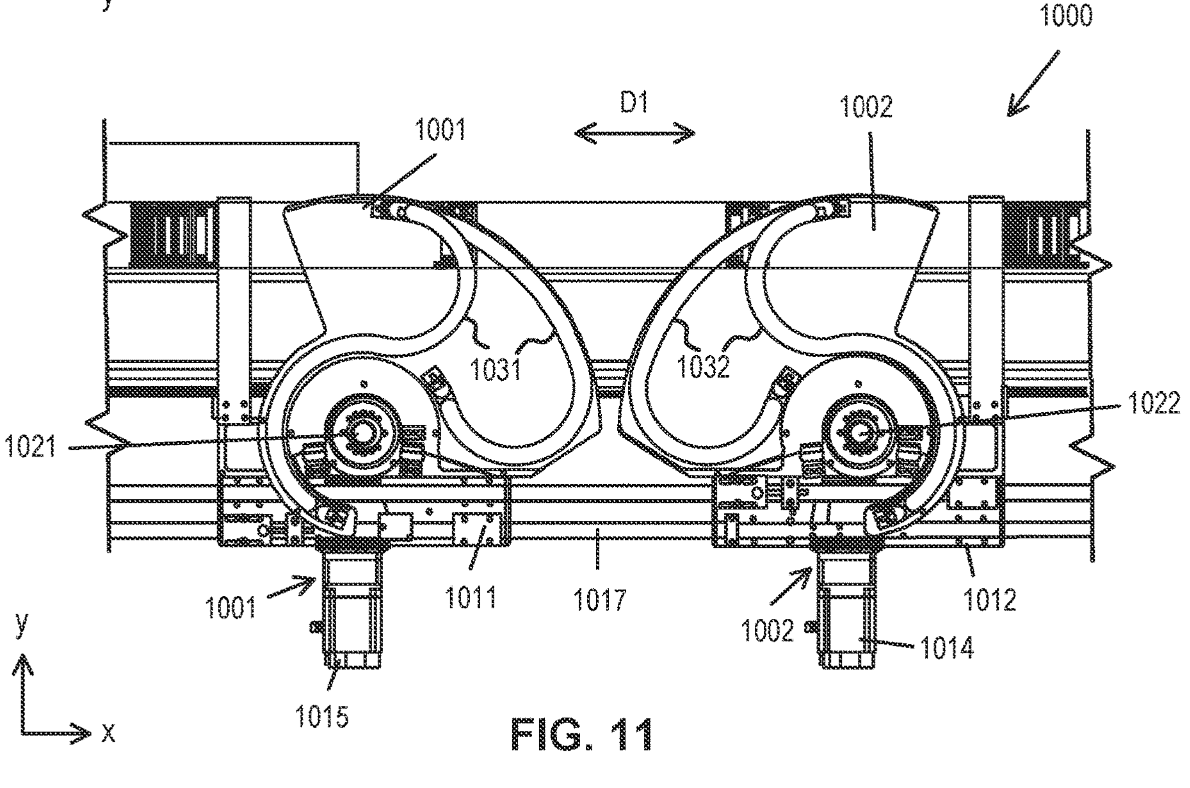
FIG. 11 illustrates a plan view of examples of bases of heads coupled to the lateral frame of FIG. 10.

FIG. 10 and FIG. 11 illustrate an example of a lateral frame 1000 coupled with structure of two heads of the transfer apparatus 200 (e.g., in FIG. 2), according to various embodiments. The lateral frame 1000 can be an example of the lateral frame 203 (e.g., see FIG. 2) of the transfer apparatus 200 and may be configured to support, guide, move the heads (e.g., 211, 222 in FIG. 2), or other functions discussed herein. For example, although depictions primarily show arrangements in which the heads 211, 212 are atop the lateral frame 1000 or otherwise supported by the lateral frame 1000 from underneath, the heads 211, 212 may be suspended by or hung from the lateral frame 1000 and/or otherwise supported by the lateral frame 1000 from above. The lateral frame 1000 may include a rail 1003 configured to support and guide a first base 1001 and a second base 1002. The first base 1001 can be part of a first head (e.g., 211 in FIG. 2) or removably coupled to the first head. Similarly, the second base 1001 can be part of a second head (e.g., 212 in FIG. 2) or removably coupled to the second head.

Each of the first base 1001 and the second base 1002 can be coupled to a rotation system to rotate the respective base. In the illustrated embodiments in FIG. 10 and FIG. 11, the rotation system may include motor and gears 1021, 1022 to rotate the respective base at a specified degree (e.g., 180°, 90°, or other rotational degrees) and at a specified angular speed. For example, the motor and gears 1021 may rotate the first base 1001 in the R1 direction (e.g., clockwise or counter-clockwise about z-axis) by a specified amount. Similarly, the motor and gears 1022 may rotate the second base 1002 in the R2 direction (e.g., clockwise or counter-clockwise about z-axis) by another specified amount. The rotation systems 1021 and 1022 can be controlled independently of each other to orient the respective head toward an inventory holder (e.g., 101 in FIG. 1) or a workstation (e.g., 110 in FIG. 1). In some embodiments, each of the bases 1001, 1002 may include flexible cable guides 1031, 1032 to guide cables therethrough and reach the bases' perimeter while the respective base is in any specified orientation. The present disclosure is not limited to a particular rotation system and other rotational systems such linkage mechanisms, belt pulley arrangements, etc. may be used.

Additionally, each of the first base 1001 and the second base 1002 can be coupled to a translation system to translate the base along the rail 1003. In the illustrated embodiments in FIG. 10 and FIG. 11, the translation system may include a belt and pulley mechanism. A belt 1017 may extend along a length of the rail 1003 and offset from the rail 1003. A bottom surface of the first base 1001 may include belt slots or channels 1011 to receive the belt 1017. Similarly, the second base 1002 may include a bottom surface with slots or channels 1012 to receive the belt 1017. In some embodiments, one, two, or more belts may be coupled to the bases 1001, 1002. Motors 1015 and 1016 may be coupled at ends of the rail 1003 or otherwise suitably positioned to actuate and/or move the belt 1017 to provide linear locomotion for the first base 1001 and the second base 1002, respectively. Furthermore, the first base 1001 may include a motor 1013 to facilitate rotation of the first base 1001. Similarly, the second base 1002 may include a motor 1014 to facilitate rotation of the second base 1002. The motors 1013 and 1014 may include or be coupled with suitable structure to facilitate rotation of the bases 1001 and 1002, e.g., which may include, but are not limited to, one or more gear reducers, belts, gear boxes, and/or direct drive rotary servo motors. The motors 1013 and 1014 may be activated individually or simultaneously, to rotate the respective the bases 1001, 1002 to specified orientations (e.g., towards a pickup area, a delivery area, or towards each other). Accordingly, by selectively activating the motors 1013-1016, the bases 1001, 1002 can be moved along the first direction D1 to a specified position (e.g., specified x-axis positions) and/or rotated in directions R1, R2. In some embodiments, the positions (e.g., x-coordinates) of the bases 1001, 1002 can be tracked. Based on tracked positions, simultaneous translation distance and speed of the bases 1001, 1002 may be controlled (e.g., by a controller (e.g., 1600 in FIG. 16) of the inventory system 100) to avoid collision. In some embodiments, one or both the bases 1001, 1002 may include a proximity sensor or other distance sensors to determine relative positions of the bases 1001, 1002 so that collisions between them can be avoided.

Figure 12:
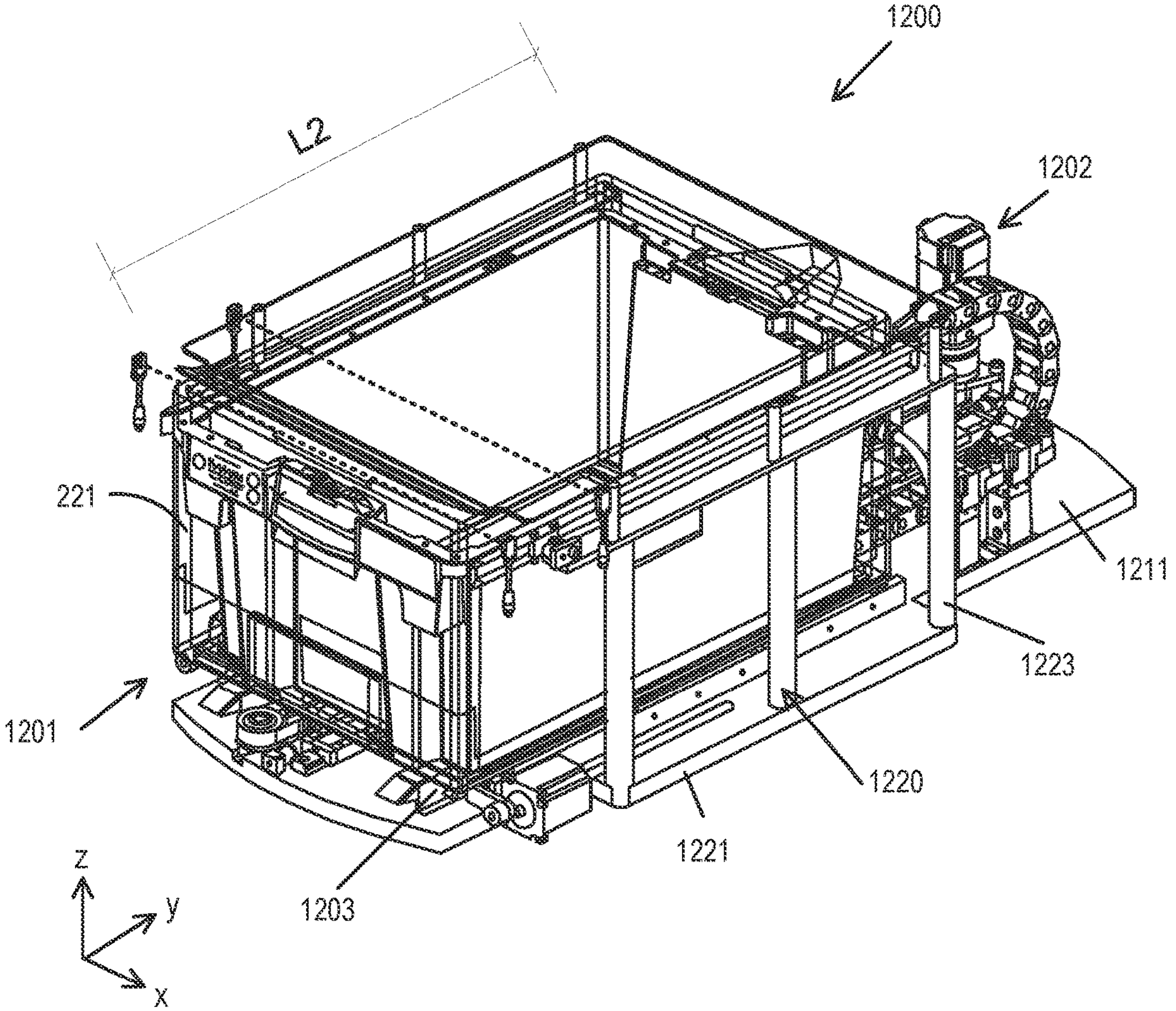
FIG. 12 and FIG. 13 illustrate an example structure of a head of the transfer apparatus of FIG. 2.
Figure 13:
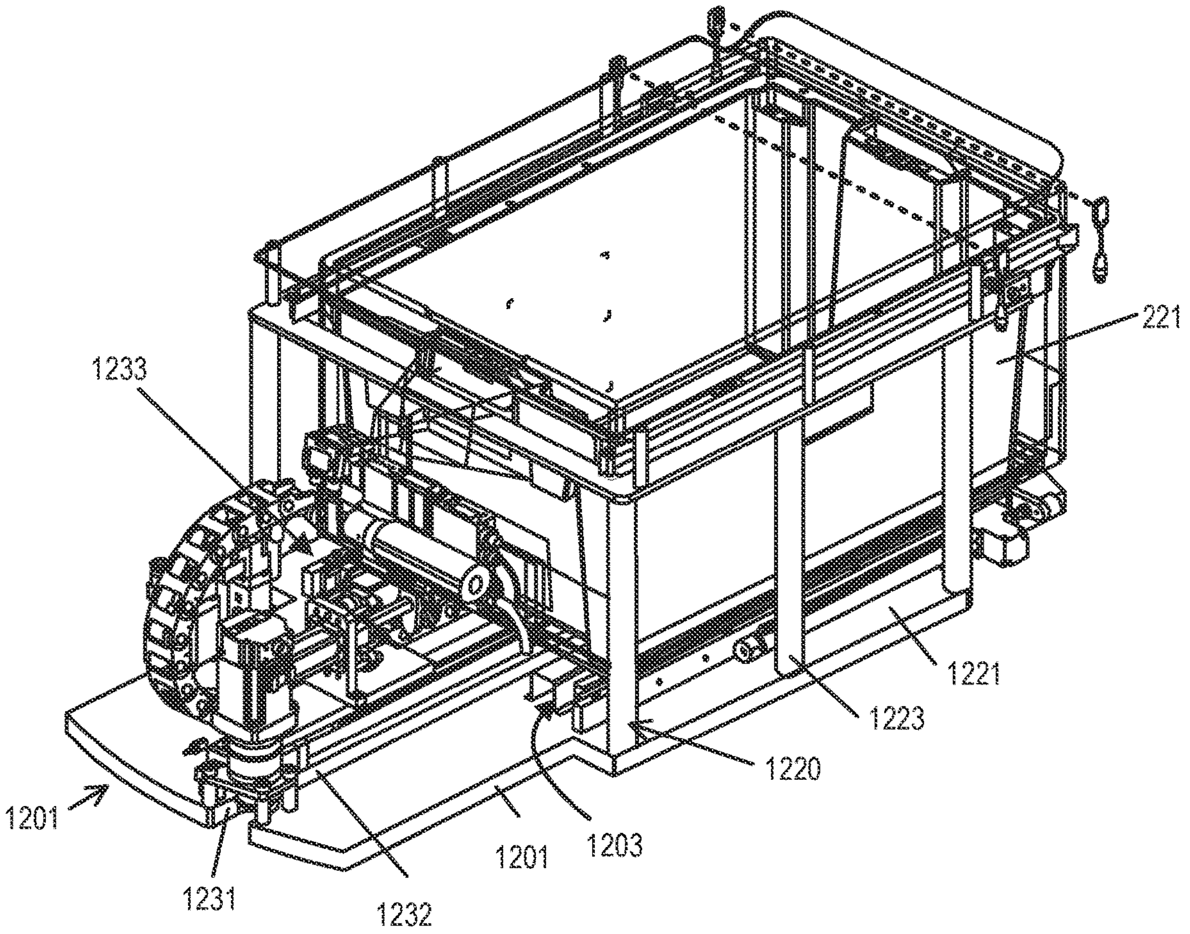

FIG. 12 and FIG. 13 illustrate an example of a head 1200 of the transfer apparatus of 200 carrying a tote, according to various embodiments. The head 1200 can be an example of the first head 211 and the second head 212 (e.g., in FIG. 2). The head 1200 may include a base 1211 (e.g., same as base 1001 or 1002 in FIG. 10), and an item carriage 1220 for receiving and carrying an item in the head. The item carriage 1220 may include an item receiving platform 1221 extending along a length of the head 1200 to support an item 221 (e.g., a tote) at the item's bottom. Accordingly, the length of the item carriage 1220 can be approximately equal to or larger than an item length (e.g., a tote length). The item receiving platform 1221 may include rails 1203 over which the item 221 can slide. The item carriage 1220 may also include side barriers 1223 to block the sides and/or ends of the item 221 from inadvertently exiting the item carriage 1220. The barriers 1223 may extend to engage with top of the item 221.

The head 1200 may include a first side 1201 having an opening from which an item 221 (e.g., a tote) can be received or delivered, and a second side 1202, opposite to the first side 1201, where an extractor or item handler 1230 may be disposed. From the first side 1201, the item 221 may slide over the item receiving platform 1221 to receive or deliver the item. The heads 1200 may have a length L2 greater than a length of an item (e.g., a tote). In various embodiments the length L2 is less than three time the length of the item. A diameter of rotation of the head 1200 is less than the length L2 of the head 1200 which facilitates compact space design for item transfer. For example, the length can be measured from one end of the first side 1201 to an opposite end of the second side 1202. The barrier 1223 can guide the item 221 onto the item receiving platform 1221. The barrier 1223 can also block the item 221 at opposite sides and prevent it from sliding off from sides.

The item handler 1230, in FIG. 13, can be configured to engage with the item 221. The item handler 1230 can include a drivetrain and guides to move an item engager to perform item transfer to/from an inventory holder and to/from a receiving station. For example, the item handler 1230 can include an item engager 1233 configured to extend along the length of the head 1200 and engage with the item 221. The item engager 1233 may include a suction cup 1234 configured to engage with the item 221. The suction cup 1234 may maintain positive engagement with the item 221 while the head 1200 moves on the lateral frame (e.g., 203 in FIG. 2). This may ensure the item 221 does not fall or displace when the head 1200 rotates or translates. In some embodiments, the suction cup 1234 may be coupled to a piston cylinder to extend and retract the suction cup 1234 so that the item 221 can be pushed or pulled over the item receiving platform 1221. In some embodiments, the item handler 1230 may include a motor 1231 coupled to a belt 1232 to translate the item 221 placed on the item receiving platform 1221. In some embodiments, the item engager 1233 may include electromagnets, mechanical latches, or other engagers.

The item handler 1230 can maintain continuous positive engagement with the items using a single engager. For example, a single suction cup or other engager (e.g., hooks) can provide such continuous and positive engagement. In other words, the item handler 1230 may do so without using multiple suction cups or multi-step item handling. For example, a multi-step handling may involve two suction cups, one to push an item on a head and another for pulling an item onto the head. During an item handling sequence, a clamp may grab an item while the pull suction cup assembly may be released and stowed away, and the push suction cup may be deployed and attached to the item.

Figure 14:
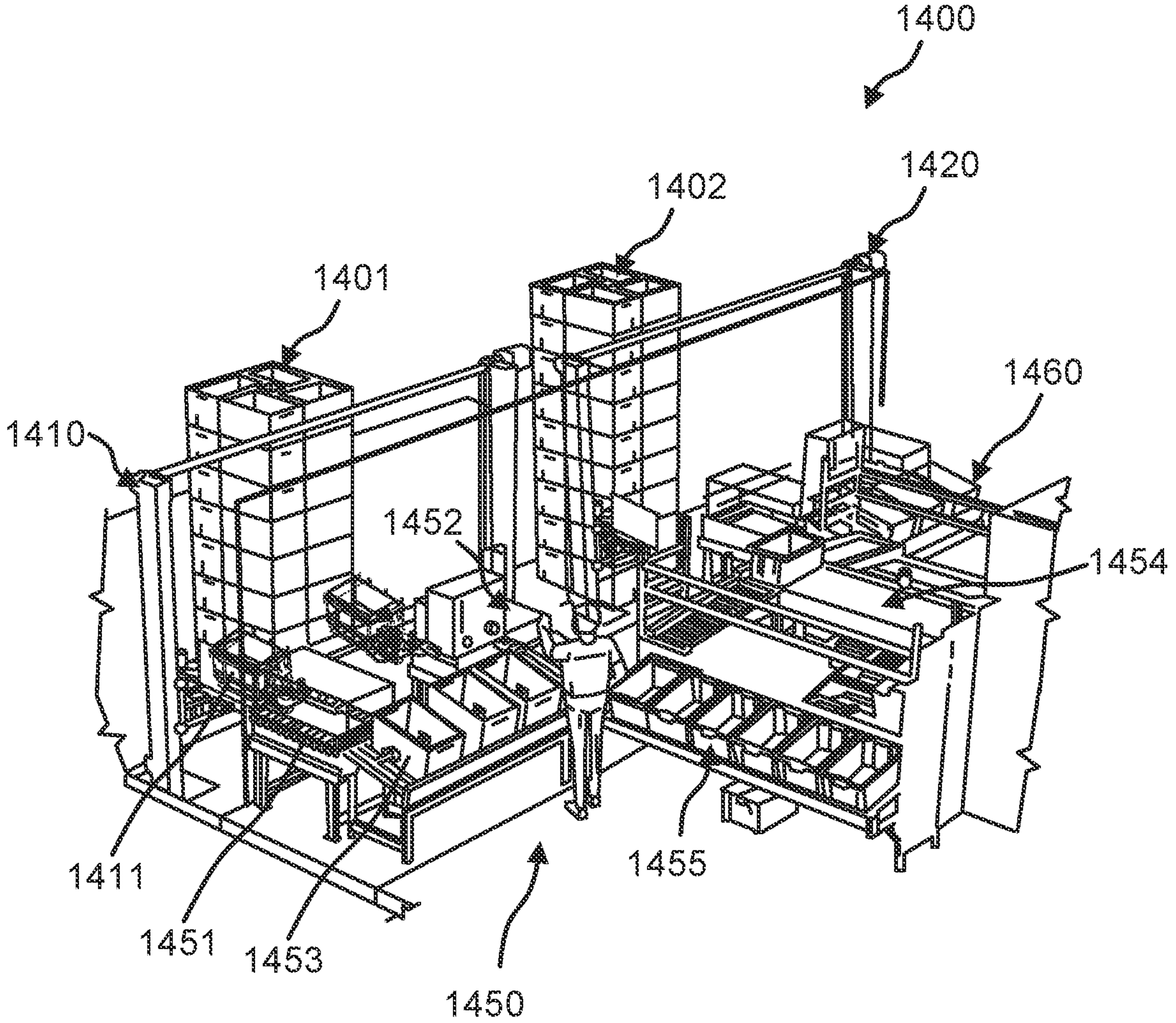
FIG. 14 illustrates another inventory system employing the transfer apparatus of FIG. 2 in accordance with various examples.

FIG. 14 illustrates another inventory system 1400 employing the transfer apparatus 200 in accordance with an example embodiment. The transfer apparatus herein may enable optimized transfer space or workspace design so that several items may be transferred simultaneously within a specified space of the inventory system 1400. For example, one or more workstations may be placed adjacent to each other without any intervening robotic arms or robotic carriers which require additional space to move around. In the illustrated embodiment, the inventory system 1400 includes transfer apparatuses 1410, 1420 (e.g., an instance of the transfer apparatus 200), inventory holders 1401 and 1402, a first workstation 1450 and a second workstation 1460. The second workstation 1460 can be mirror image of the first workstation 1450 and configured to transfer items in a similar manner (which may include implementing a similar or mirrored direction of flow of items in use). Items may be transferred between the respective workstation 1450, 1460 and respective inventory holders 1401, 1402.

The transfer apparatus 1410 may be configured to transfer items between the first workstation 1450 and the inventory holder 1401, as discussed with respect to FIG. 1 and FIG. 5 to FIG. 8. Similarly, another transfer apparatus 1420 may transfer items between the second workstation 1460 and another inventory holder 1402. For example, a first head 1411 (e.g., an instance of the first head 211) may be used receive item from a first conveyor 1451 of the first workstation 1450 and store the item in a space of the inventory holder 1401 and a second head may be used to extract an item from another space of the inventory holder 1401 and deliver the item to a delivery area 1452 of the first workstation 1450. Similarly, items may be transferred between the second workstation 1460 and the inventory holder 1402.

The workstations 1450 and 1460 may share a common delivery system 1454 between delivery station 1455 of the first workstation 1450 and another delivery station of the second workstation 1460. The common delivery system 1454 can include conveyors or other suitable structure to receive items from the delivery stations (e.g., 1455) of the respective workstations and convey to external material handling system features. Accordingly, the workspace at the pickup and delivery side can be optimized. Similarly, a dedicated area may be occupied by the inventory holders 1401, 1402 so that inventor holders 1401, 1402 (or more) can move around without interference from human operators, or other robotic carriers moving individual items.

Figure 15:
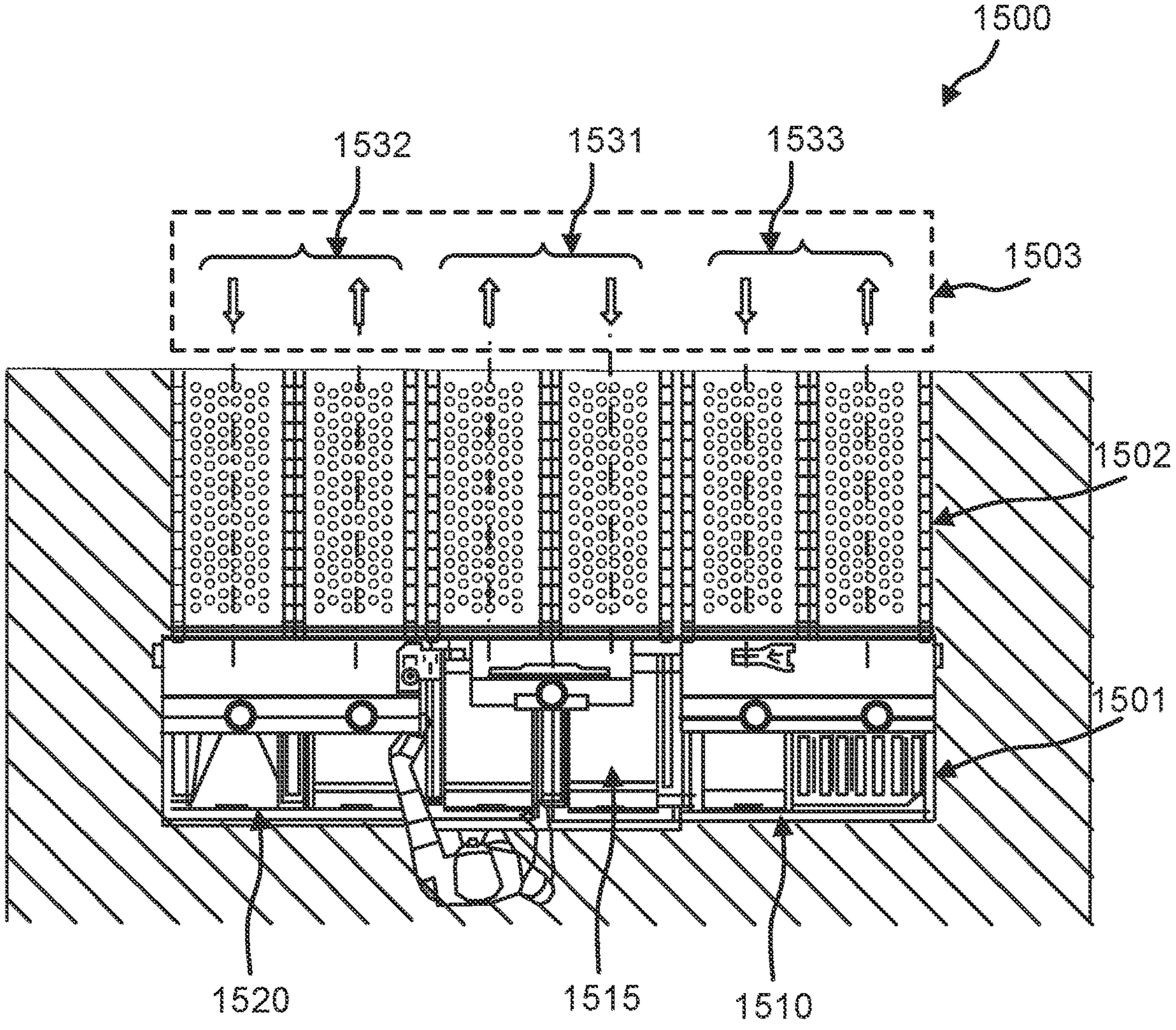
FIG. 15 illustrates yet another example of an inventory system employing the transfer apparatus of FIG. 2 in accordance with various embodiments.

FIG. 15 illustrates another inventory system 1500 employing the transfer apparatus 200 in accordance with another example embodiment. The transfer space or workspace of the inventory system 1500 is configured differently compared to the inventory systems 100 and 1400, at least in terms of items flow. The inventory system 1500 may include a workstation area 1501, an inventory area 1502, and a transfer apparatus area 1503. The workstation area may be divided into a first area 1510 on a right side, a second area 1515 at a center, and a third area 1520 on a left side. Similarly, the inventory area 1502 may be divided into a source area 1531 at a center, a first destination area 1532 on a right side, and a second destination area 1533 on a left side. At the center areas 1515, 1531, source items (e.g., items to be delivered to a customer) may be circulated. At the right areas 1510, 1533, and the left areas 1520, 1532 may be configured to circulate destination items (e.g., items to be stored away, repaired, or discarded).

An operator may be positioned at the center area 1515 of the workstation 1501 so that he can handle source items, as well as destination items with minimum to no lateral movement. This can improve the item handling time compared to when the operation may have to move from one point to another to position items in specified destination areas. In operation, the items may be circulated (e.g., via conveyors) from the source area 1531 to the center workstation area 1515. The operator may then position an item at appropriate areas 1510 or 1520 so that the items can be circulated to the destination area 1531 or 1532. The items can be picked up from the workstations 1510, 1520 and delivered to conveyors in the destination areas 1502. Further, one or more transfer apparatuses (not illustrated) placed in the transfer apparatus area 1503 may further receive the items from the inventory area 1502. Accordingly, a large number of items may be handled by a single operator using the transfer apparatus within the space configuration of the inventory system 1500.

Figure 16:
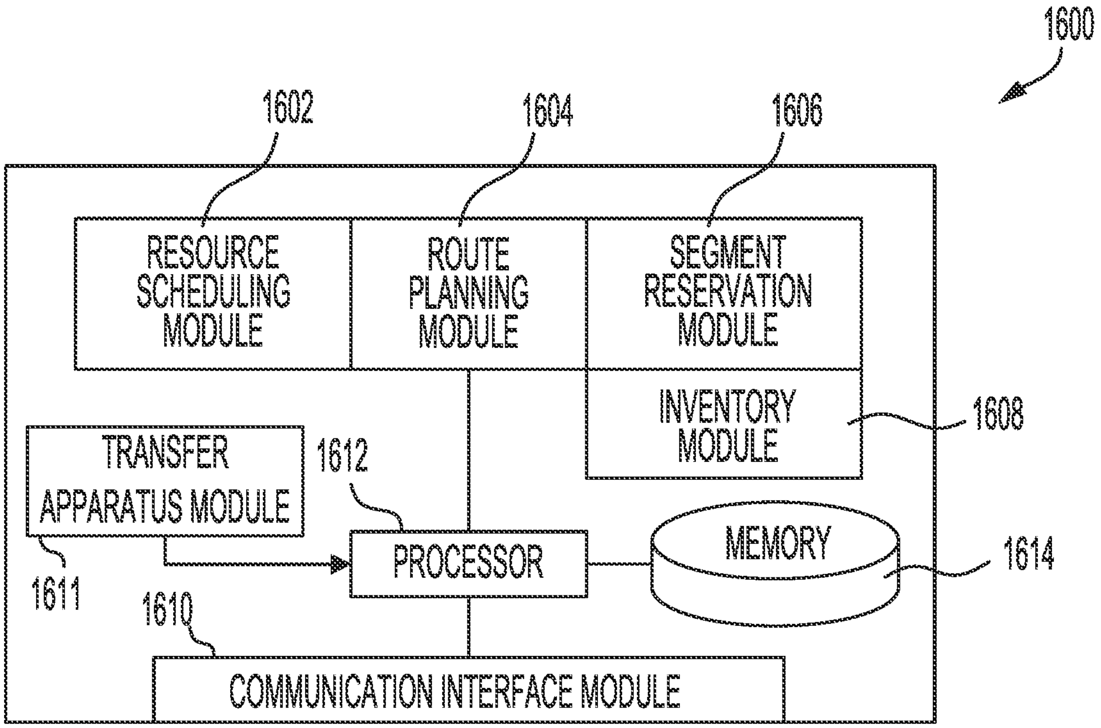
FIG. 16 is a block diagram illustrating an example of a controller that may be utilized in accordance with various embodiments.

Turning to FIG. 16, an example control system or a controller is shown in greater detail. The control system or controller may be utilized in particular embodiments of the systems or architectures discussed herein. The controller 1600 may also be referred to as a management module as it is used to manage various aspects of material transfer in an inventory system. In the illustrated embodiment, the controller 1600 may include a resource scheduling module 1602, a route planning module 1604, a segment reservation module 1606, an inventory module 1608, a communication interface module 1610, a transfer apparatus module 1611, a processor 1612, and a memory 1614. As an example, the controller 1600 can represent a single component, multiple components located at a central location within inventory system 100, or multiple components distributed throughout inventory system 100. For example, the controller 1600 may represent components of one or more mobile drive units (e.g., 150 in FIG. 4) that are capable of communicating information between the mobile drive units 150 and coordinating the movement of mobile drive units 150 within the first area 107 where inventory holders 101 can be located. The controller 1600 may represent one or more components (e.g., the transfer apparatus module 1611) of the transfer apparatus 200 that is/are capable of communicating information of head positions during an item transfer and receiving item transferring commands (e.g., rotate, translate, extract, deliver, etc.) from the controller 1600. In general, controller 1600 may include any appropriate combination of hardware and/or software suitable to provide the described functionality.

The processor 1612 is operable to execute instructions associated with the functionality provided by controller 1600. The processor 1612 can comprise one or more general purpose computers, dedicated microprocessors, or other processing devices capable of communicating electronic information. Examples of the processor 1612 include one or more application-specific integrated circuits (ASICs), field programmable gate arrays (FPGAs), digital signal processors (DSPs) and any other suitable specific or general purpose processors.

The memory 1614 can store processor instructions, inventory requests, reservation information, state information for the various components of inventory system 100 and/or any other appropriate values, parameters, or information utilized by controller 1600 during operation. The memory 1614 can represent any collection and arrangement of volatile or nonvolatile, local or remote devices suitable for storing data. Examples of the memory 1614 may include, but are not limited to, random access memory (RAM) devices, read only memory (ROM) devices, magnetic storage devices, optical storage devices or any other suitable data storage devices.

The resource scheduling module 1602 can process received inventory requests and generate one or more assigned tasks to be completed by the components of inventory system 100. The resource scheduling module 1602 can additionally or alternatively include one or more appropriate components for completing the assigned tasks and, using communication interface module 1610, communicate the assigned tasks to the relevant components. Additionally, the resource scheduling module 1602 can also be responsible for generating assigned tasks associated with various management operations, such as prompting the mobile drive units 150 carrying the inventory holder 101 to move to workstations 110.

The route planning module 1604 receives route requests from mobile drive units 150. These route requests identify one or more destinations associated with a task the requesting mobile drive unit is executing. In response to receiving a route request, the route planning module 1604 can generate a path to one or more destinations identified in the route request. The route planning module 1604 may implement any appropriate algorithms utilizing any appropriate parameters, factors, and/or considerations to determine the appropriate path. After generating an appropriate path, the route planning module 1604 can transmit a route response identifying the generated path to the requesting mobile drive unit 150 using, using for example, the communication interface module 1610. According to the present disclosure, the transfer apparatus and optimized space design of the inventory system (e.g., 100) significantly simplifies the coordination between the mobile drive units 150 carrying the inventory holders 101 as a dedicated space can be assigned without any interference from other mobile drive units carrying a single item or human operators. As such, faster and more efficient routes may be planned for faster item transfer within a specified transfer space.

The segment reservation module 1606 can receive reservation requests from mobile drive units 150 attempting to move along paths generated by the route planning module 1604. These reservation requests request the use of a particular portion of the first area 107 (also referred to herein as a "segment") to allow the requesting mobile drive unit to avoid collisions with other mobile drive units while moving across the reserved segment. In response to received reservation requests, the segment reservation module 1606 can transmit a reservation response granting or denying the reservation request to the requesting mobile drive unit using the communication interface module 1610.

The inventory module 1608 can maintain information about the location and number of items in the inventory system 100. Information can be maintained about the number of items in a particular inventory holder 101 and/or inventory holder 101 and the maintained information can include the location of those items in the inventory holder 101 and/or inventory holder 101. The inventory module 1608 can also communicate with the transfer apparatus module 1611 maintain, replenish or move items within the inventory system 100.

The communication interface module 1610 can facilitate communication between controller 1600 and other components of inventory system 100, including reservation responses, reservation requests, route requests, route responses, and task assignments. These reservation responses, reservation requests, route requests, route responses, and task assignments may represent communication of any form appropriate based on the capabilities of controller 1600 and may include any suitable information. Depending on the configuration of controller 1600, the communication interface module 1610 can be responsible for facilitating either or both of wired and wireless communication between the controller 1600 and the various components of inventory system 100. In particular embodiments, the controller 1600 can communicate using communication protocols such as 802.11, Bluetooth, or Infrared Data Association (IrDA) standards. Furthermore, the controller 1600 can, in particular embodiments, represent a portion of mobile drive unit 150 or other components of inventory system 100. In such embodiments, the communication interface module 1610 can facilitate communication between controller 1600 and other parts of the same system component.

In general, the resource scheduling module 1602, the route planning module 1604, the segment reservation module 1606, the inventory module 1608, the transfer apparatus module 1611, and the communication interface module 1610 can each represent any appropriate hardware and/or software suitable to provide the described functionality. In addition, as noted above, the controller 1600 may, in particular embodiments, represent multiple different discrete components and any or all of the resource scheduling module 1602, the route planning module 1604, the segment reservation module 1606, the inventory module 1608, the transfer apparatus module 1611, and the communication interface module 1610 can represent components physically separate from the remaining elements of controller 1600. Moreover, any two or more of the resource scheduling module 1602, the route planning module 1604, the segment reservation module 1606, the inventory module 1608, the transfer apparatus module 1611, and the communication interface module 1610 can share common components. For example, in particular embodiments, the resource scheduling module 1602, the route planning module 1604, the segment reservation module 1606, and the inventory module 1608 can represent computer processes executing on the processor 1612 and the communication interface module 1610 comprises a wireless transmitter, a wireless receiver, and/or a related computer process executing on the processor 1612.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory handling system, comprising:
a receiving station comprising:
a first conveyor arranged for delivery of a first item at a first end; and
a second conveyor arranged for receipt of a second item at a second end laterally opposite to the first end;
an inventory holder comprising a rack sized to store at least the first item, the second item, or the first item and the second item; and
a transfer apparatus disposed in an area between the receiving station and the inventory holder, the transfer apparatus operable to perform item transferring operation between the receiving station and the inventory holder, the transfer apparatus comprising:
a lateral frame extending in a horizontal direction;
an upright frame along which the lateral frame is moveable in a vertical direction;
a first rotatable head coupled to the lateral frame, the first rotatable head being translatable in the horizontal direction and rotatable between the inventory holder and the receiving station, the first rotatable head comprising a first item receiving platform extending along a length of the first rotatable head and configured to support the first item or the second item from underneath; and
a second rotatable head coupled to the lateral frame and spaced from the first rotatable head, the second rotatable head being translatable in the horizontal direction and rotatable between the inventory holder and the receiving station, the second rotatable head being translatable and rotatable independently of the first rotatable head, the second rotatable head comprising a second item receiving platform configured to extend along a length of the second rotatable head and support the first item or the second item from underneath,
wherein the first rotatable head is configured to retrieve the first item from the first conveyor at the first end of the receiving station, and
wherein the second rotatable head is configured to deliver the second item to the second conveyor at the second end of receiving station while the first rotatable head retrieves the first item to simultaneously transfer items relative to the receiving station.

2. The inventory handling system of claim 1, wherein the first rotatable head and the second rotatable head operate simultaneously while handling the first item and the second item.

3. The inventory handling system of claim 1, wherein each of the heads further comprises a suction cup maintainable in positive item engagement while the respective head rotates and translates.

4. The inventory handling system of claim 1, wherein the first rotatable head and the second rotatable head are rotatable and translatable towards to align with each other to transfer an item between each other.

5. The inventory handling system of claim 1, wherein the transfer apparatus is dimensioned to minimize a transfer station space occupied by the receiving station, the transfer apparatus, and the inventory holder, wherein each of the heads have a length greater than a length of an item and less than two time the length of the item.

6. The inventory handling system of claim 1, further comprising:

a second workstation positioned at an adjacent side to the receiving station, the second workstation interacting with the transfer apparatus or a second transfer apparatus to circulate a set of destination items to be stored in an inventory space; and a third workstation positioned on an opposite adjacent side to the receiving station, the second workstation interacting with the transfer apparatus or a third transfer apparatus to circulate another set of destination items to be stored in an inventory space.

7. A transfer apparatus, comprising:

a lateral frame extending in a first direction;

an upright frame arranged to guide and support movement of the lateral frame in a second direction;

a first rotatable head coupled to the lateral frame and configured to translate in the first direction, the first rotatable head comprising an item receiving platform configured to extend along a length of the first rotatable head and to support at least an item from underneath; and a second rotatable head coupled to the lateral frame and configured to translate in the first direction, the second rotatable head being spaced from the first rotatable head, the second rotatable head being configured to rotate and translate independently of the first rotatable head.

8. The transfer apparatus of claim 7, wherein the first rotatable head and the second rotatable head operate simultaneously and independently of each other during an item transfer.

9. The transfer apparatus of claim 7, wherein each of the heads comprises or is coupled with a base coupled with a rotation system configured to rotate the base, wherein each of the heads further comprises or is coupled with a translation system configured to translate the base along the lateral frame, and wherein each of the heads further comprises or is coupled with the item receiving platform above the base.

10. The transfer apparatus of claim 9, wherein the rotation system of the base comprises a motor and a gear system to rotate the base at a specified degree and at a specified angular speed or acceleration.

11. The transfer apparatus of claim 9, wherein the translation system comprises a belt and pulley mechanism, wherein the belt is coupled to the base to translate the base in a specified direction.

12. The transfer apparatus of claim 7, wherein each of the heads further comprises a suction cup configured to stay positively engaged during rotation and translation of the respective head.

13. The transfer apparatus of claim 7, further comprising a controller configured for collision avoidance between the heads by tracking positions of each head and their proximity based on tracked positions.

14. The transfer apparatus of claim 7, wherein the upright frame comprises a belt and pulley mechanism configured to move the lateral frame in the second direction.

15. A method for transferring items using a transfer apparatus comprising independently rotatable and translatable heads, the method comprising:

moving a first head of the transfer apparatus towards a first area of a receiving station to align for receipt of a first item, the first head of the transfer apparatus comprising a first item receiving platform configured to extend along a length of the first head and to support the first item from underneath;

moving a second head carrying a second item towards a second area of the receiving station, the second head of the transfer apparatus comprising a second item receiving platform configured to extend along a length of the second head and to support the second item from underneath; and receiving the first item onto the first head while simultaneously delivering the second item from the second head onto a second area of the receiving station.

16. The method of claim 15, wherein moving the second head comprises at least:

translating the second head towards an inventory holder to extract the second item from the inventory holder;

upon receiving the second item, rotating the second head towards the receiving station; and translating the second head towards the second area of the receiving station to deliver the second item at the second area.

17. The method of claim 15, wherein simultaneously while delivering the second item, moving the first head while carrying the first item towards an inventory holder by translating, or rotating the first head.

18. The method of claim 16, further comprises:

moving a lateral frame of the transfer apparatus along a vertical direction to vertically align the first head towards the first area of the receiving station;

moving the lateral frame of the transfer apparatus along the vertical direction to vertically align the first head towards a specified level of the inventory holder;

moving the lateral frame of the transfer apparatus along the vertical direction to vertically align the second head towards the second area of the receiving station; or moving the lateral frame of the transfer apparatus along the vertical direction to vertically align the second head towards another specified level of the inventory holder.

19. The method of claim 15, further comprising simultaneously while moving the lateral frame, translating or rotating the first head.

20. The method of claim 15, further comprising:

activating a suction cup of the first head to pick the first item;

continuously and positively engaging the first item while the first head is translating and rotating;

activating a suction cup of the second head to pick the second item; and continuously and positively engaging the second item while the second head is translating and rotating.

* * * * *